United States Patent
Uehara

(10) Patent No.: US 7,957,633 B2
(45) Date of Patent: Jun. 7, 2011

(54) FOCUS ADJUSTING APPARATUS AND FOCUS ADJUSTING METHOD

(75) Inventor: Akiko Uehara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/705,327

(22) Filed: Feb. 12, 2010

(65) Prior Publication Data

US 2010/0209093 A1    Aug. 19, 2010

(30) Foreign Application Priority Data

Feb. 17, 2009  (JP) .................................. 2009-034113

(51) Int. Cl.
 *G03B 3/00* (2006.01)
(52) U.S. Cl. ..................... 396/124; 348/349; 352/140
(58) Field of Classification Search .................. 396/89, 396/104, 124, 137; 348/345, 349; 352/140; 359/823
See application file for complete search history.

(56) References Cited

U.S. PATENT DOCUMENTS 5,144,357 A * 9/1992 Ishida et al. .................. 396/104

FOREIGN PATENT DOCUMENTS

| JP | 2003-295040 A | 10/2003 |
| JP | 4106485 B2 | 6/2008 |

* cited by examiner

*Primary Examiner* — Clayton E Laballe
*Assistant Examiner* — Autumn Parker
(74) *Attorney, Agent, or Firm* — Canon U.S.A., Inc. IP Division

(57) ABSTRACT

There are provided a focus adjusting apparatus and method in which judgment of an object area to be focused can be favorably performed when the judgment of the object area to be focused is executed at the time of image-taking preparation operation. In the focus adjusting apparatus and method, a first operation of determining the object area to be focused is performed prior to the image-taking preparation operation, and a second operation different from the first operation is performed to execute a focusing operation at the time of the image-taking preparation operation. Prior to the first operation, whether or not an object to be focused can be predicted is judged to change a manner of the first operation based on a result of a judgment.

10 Claims, 18 Drawing Sheets

FOCUS ADJUSTING APPARATUS AND FOCUS ADJUSTING METHOD

BACKGROUND OF THE INVENTION

1. Field of the Invention

The present invention relates to focus adjusting apparatuses and focus adjusting methods. Particularly, the present invention relates to automatic focus adjusting techniques.

2. Description of the Related Art

Conventionally, in a case where automatic focusing (AF) is performed in electronic still cameras and video cameras, a method is used, in which a lens position at which a high frequency component of a luminance signal supplied from an image-pickup element, such as CCD (Charge Coupled Device), is maximum is treated as an in-focus position. The following scan method is known as such a method. In the scan method, an evaluation value (focus evaluation value) calculated based on the high frequency component of the luminance signal obtained from the image-pickup element is successively stored while the lens is driven over its entire move range, and the lens position at which the thus-stored evaluation value exhibits the maximum is treated as the in-focus position.

In another method, a lens continues to be moved in such a direction that the focus evaluation value increases. This method is known as the hill climbing method (also referred to as continuous AF hereinafter).

Further, Japanese Patent No. 4,106,485 discloses the following method. In this method, the continuous AF is executed prior to instructions for image-taking preparation operation to maintain an in-focus state, thereby restricting the move range of a focus lens to be moved by the AF scan method for performing the image-taking preparation operation subsequent to instructions therefor. Thus, the AF operation time is decreased.

In the continuous AF, in a case where the lens is to be moved in such a direction that the focus evaluation value increases, focusing cannot be executed on an object to be focused unless an area to be focused is identified or determined in an image plane.

In the method of the above Japanese Patent, the above scan method is combined with the continuous AF to speedily perform the focusing operation. However, identification is not performed with respect to an object (principal object) to be focused in the image plane, on which a user wants to focus. Therefore, there is a possibility that focusing cannot be executed on an object to be focused, depending on the condition of an image-taking scene.

SUMMARY OF THE INVENTION

According to the present invention, an apparatus includes a receiving unit configured to receive an instruction for focus adjustment, an image-pickup unit configured to perform image-pickup of an image input through a focus lens to output image data, a setting unit configured to set a focus detecting area, and a focus adjusting unit configured to detect a focus signal in the focus detecting area while moving the focus lens to adjust a position of the focus lens in a predetermined range based on the focus signal. The focus signal represents a focus state of the focus lens. The focus adjusting unit controls a first operation for detecting the focus signal prior to reception of the instruction to determine an object area to be focused, and a second operation for detecting the focus signal based on information of the determined object area upon reception of the instruction to perform focus adjustment of the focus lens, and judges whether or not an object to be focused can be predicted prior to the first operation to change a manner of the first operation based on a result of a judgment.

Further features of the present invention will become apparent from the following description of exemplary embodiments with reference to the attached drawings.

DESCRIPTION OF THE EMBODIMENTS

Various embodiments of the present invention will be described in detail in accordance with the accompanying drawings.

Figure 1:
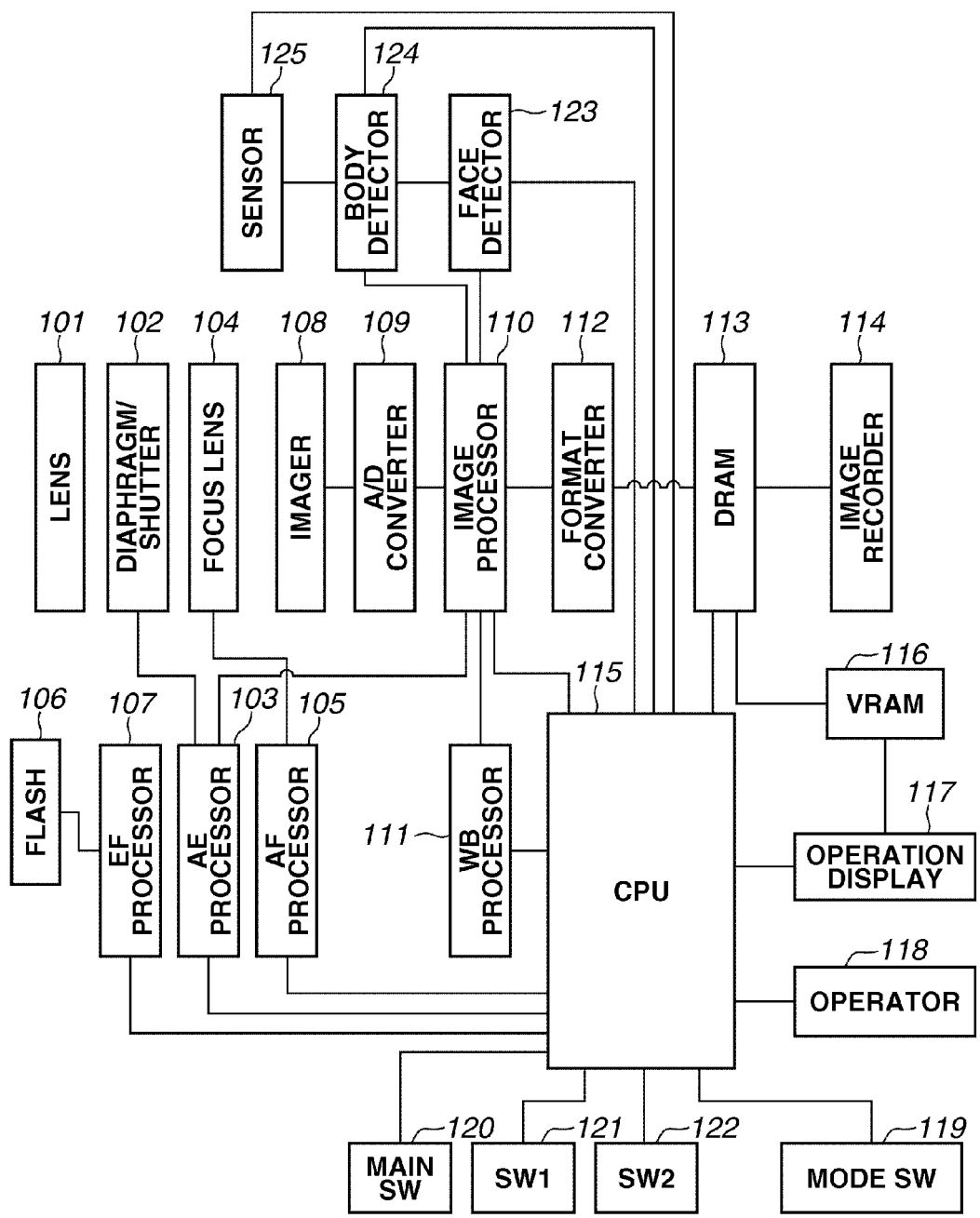
FIG. 1 is a block diagram illustrating the structure of an embodiment of a focus adjusting apparatus according to the present invention.

FIG. 1 illustrates the structure of a camera with the embodiment of a focus adjusting apparatus according to the present invention.

In FIG. 1, reference numeral 101 designates an image-taking lens including a zoom mechanism. Reference numeral 102 designates a diaphragm/shutter for controlling the amount of incident light. Reference numeral 103 designates an AE processing portion including a drive portion for driving the diaphragm/shutter. Reference numeral 104 designates a focus lens for performing focusing on an image-pickup element described below. Reference numeral 105 designates an AF processing portion including a drive portion for the focus lens 104. Reference numeral 106 designates an electric flash unit. Reference numeral 107 designates an electric flash (EF) processing portion.

Reference numeral 108 designates the image-pickup element or imager for converting reflection light from an object into an electric signal. Reference numeral 109 designates an A/D converting portion including a CDS (correlated double sampling) circuit for removing noises in an output from the image-pickup element 108 and a non-linear amplifying circuit for performing process prior to the A(analog)/D(digital) conversion.

Reference numeral 110 designates an image processing portion for performing process of calculating a luminance signal of the object from the output signal of the image-pickup element, and extracting a signal component in a specific frequency band of the luminance signal to acquire the focus evaluation value, and other processes. Reference numeral 111 designates a WB (white balance) processing portion. Reference numeral 112 designates a format converting portion.

Reference numeral 113 designates a high-speed built-in memory (also referred to as DRAM) such as a random access memory. The DRAM 113 can be used as a high-speed buffer memory for temporarily storing image data, or a work memory for image compression and decompression. Reference numeral 114 designates an image recording portion including a recording medium such as a memory card, and its interface. Reference numeral 115 designates a system controlling portion (CPU) for controlling the entire system in operations such as image-taking sequence. Reference numeral 116 designates a memory for image display (VRAM). Reference numeral 117 designates an operation displaying portion for displaying not only images but also indications for assisting operations, indications showing the camera status, and indications showing the image-taking screen or image plane, and focus detecting areas at the time of image-taking.

Reference numeral 118 designates an operating portion for operating the camera from outside. The operating portion 118 includes a menu switch for various settings such as a setting of image-taking function and a setting of image replaying, a zoom lever for instructing the zoom operation of the image-taking lens, and an operation mode changing switch for changing the operation mode between an image-taking mode and a replaying mode, for example. Reference numeral 119 designates an image-taking mode switch for performing a setting of ON or OFF of the face detection mode, and the like.

Reference numeral 120 designates a main switch for turning on the electric power of the system. Reference numeral 121 designates an image-taking stand-by switch (SW1) for performing instructions for image-taking stand-by operations such as AF operation and AE operation. Upon operation of this SW1 (121), an in-focus position of the focus lens 104 for image-taking is determined. Procedures for this determination will be described below. Reference numeral 122 designates an image-taking switch (SW2) for performing instructions for image-taking subsequent to the operation of SW1.

Reference numeral 123 designates a face detection module for performing the face detection, for example, at given intervals, by using the image signal processed by the image processing portion 110, and supplying information (position, size and reliability) of a face or plural faces detected to the CPU 115. The face detection module 123 performs face recognition process to the image signal to detect information of the determined object (size of the face of a person in the image-taking image plane, position thereof, and reliability representing likelihood of the face), and supplies the detection result to the CPU 115. The face recognition process includes, for example, a template matching method of extracting a skin color area from gradation color in each pixel represented by image data to detect the face using a matching degree relative to a face profile template prepared beforehand, and a pattern recognition method of performing pattern recognition based on extracted features of the face such as eyes, nose, mouth and the like. The face detecting method includes, in addition to the pattern recognition method, a method of using learning with neural network and the like, and a method of extracting characteristic portions in a physical shape from the image area. Further, there are many methods such as a method of statistically analyzing amounts of image features such as skin color and eye shape of the detected face, and the like.

Furthermore, as a method whose practical use has been studied, there are a method of using wavelet conversion and amounts of image features, and the like. The face size can be judged from the number of pixels counted in the face area (face coordinates) from information of the detected face. It is also possible to judge the face size by calculating the distance between eyes based on information of the detected face (eye position information) to make a table using the statistic relationship with the eye distance and the face size (the number of pixels) obtained beforehand. It is further possible to judge the face size by calculating the number of pixels in the face area from values in coordinates of face's four corners (given positions).

Reference numeral 124 designates a moving object detecting portion for detecting whether or not the object or background in the image plane is moving, and supplying the moving object information to the CPU 115. More specifically, two images arranged in time series of image signals processed by the image processing portion 110 are compared with each other, and from difference information of the comparison result, the moving object information (move amount, position and range) of the object/background is detected. Reference numeral 125 designates an angular velocity sensor for detecting the angular velocity of the camera, and supplying information of the camera motion to the CPU 115. By using the angular velocity sensor, it is also possible to detect the attitude of the camera (i.e, erected attitude or horizontal attitude).

The operation of the electronic camera of this embodiment will be described with reference to the flow chart in FIG. 2. In step S201, the CPU 115 judges the state (ON/OFF) of SW1 for performing instructions for image-taking preparation. When the state is ON, the step proceeds to step S212. When the state is OFF, the state proceeds to step S202. In step S202, scene stability is judged. In step S203, the judgment of stability of the image-taking scene in step S202 is checked. When the image-taking scene is judged to be stable, the step proceeds to step S204. If not, the step returns to step S201. Here, the stable state of the image-taking scene is a state in which the object to be photographed and the camera are maintained stable so that the image-taking can be appropriately performed. For example, when the move amount of the camera detected by the angular velocity sensor 125 is below a given amount, the state of the camera can be considered to be stable.

In step S204, whether or not the object luminance is below a given value is checked. When the object luminance is below a given value, the step proceeds to step S205. If not, the step proceeds to step S206. In step S205, an AF frame setting for low luminance is performed. Here, the AF frame is an area in the image plane at which the focus evaluation value is obtained. Further, the focus evaluation value is a value that is acquired by converting the analog picture image signal read from the image-pickup element 108 into the digital signal by the A/D converting portion 109, and extracting the high frequency signal component of the luminance signal from the digital signal by the image processing portion 110. This evaluation value is stored in the CPU 115, corresponding to positions of the focus lens 104 and the AF frame. To obtain the focus evaluation value means to read the focus evaluation value stored in the CPU 115 for the purpose of judgment in the AF control by the AF processing portion 105. When the luminance is low, the exposure time is likely to lengthen. Hence, a sufficient AF precision can be hardly secured in the AF scan. Accordingly, in this embodiment, when the luminance is low, the identification or determination of the object area and the scan for the face detection are omitted, and a single AF frame with a given size is set near a central portion of the image plane.

In step S206, the face detection module 123 checks whether the face is detected or not. When the face is detected, the step proceeds to step S207. If not, the step proceeds to step S208. In step S207, the AF scan at the time of the face detection is performed according to procedures described below (see FIG. 3). Then, the step proceeds to step S209. In step S208, the AF scan for determining the object area is performed according to procedures described below (see FIG. 6). In step S209, the continuous AF is performed according to procedures described below (see FIG. 15).

Here, alternatively, it is possible to perform the focusing operation about the determined object area only once without performing the continuous AF, or only determine the object area. In such a case, the step succeeds to a next second scan operation.

In step S210, the scene instability judgment is performed. In step S211, whether or not the image-taking scene is judged to be instable in step S210 is checked. When the scene is judged to be instable, the step proceeds to step S201. If not, the step proceeds to step S209. Here, the instable state of the image-taking scene is a state in which the state of the object or the camera is so instable that an appropriate image-taking cannot be achieved. For example, the move amount of the camera detected by the angular velocity sensor 125 is above a given amount, or the change amount of the luminance from the previous one is above a given amount, or the face detection state (i.e, the face is detected or not) detected by the face detection module 123 changes. In such a case, it is judged that the image-taking scene changes (i.e, the scene is instable).

At the time when the state of SW1 for instructing the image-taking preparation is ON, the step proceeds from step S201 to step S212. In step S212, the focus degree judging flag is set to FALSE. In step S213, the image-taking process is executed according to procedures described below (see FIG. 16).

During the above-discussed operation, the AE processing portion 103 controls the diaphragm/shutter 102 based on the control signal from the CPU 115. Brightness of the image displayed on the operation displaying portion 117 is made appropriate by such AE operation for controlling AE processing portion 103.

Figure 2:
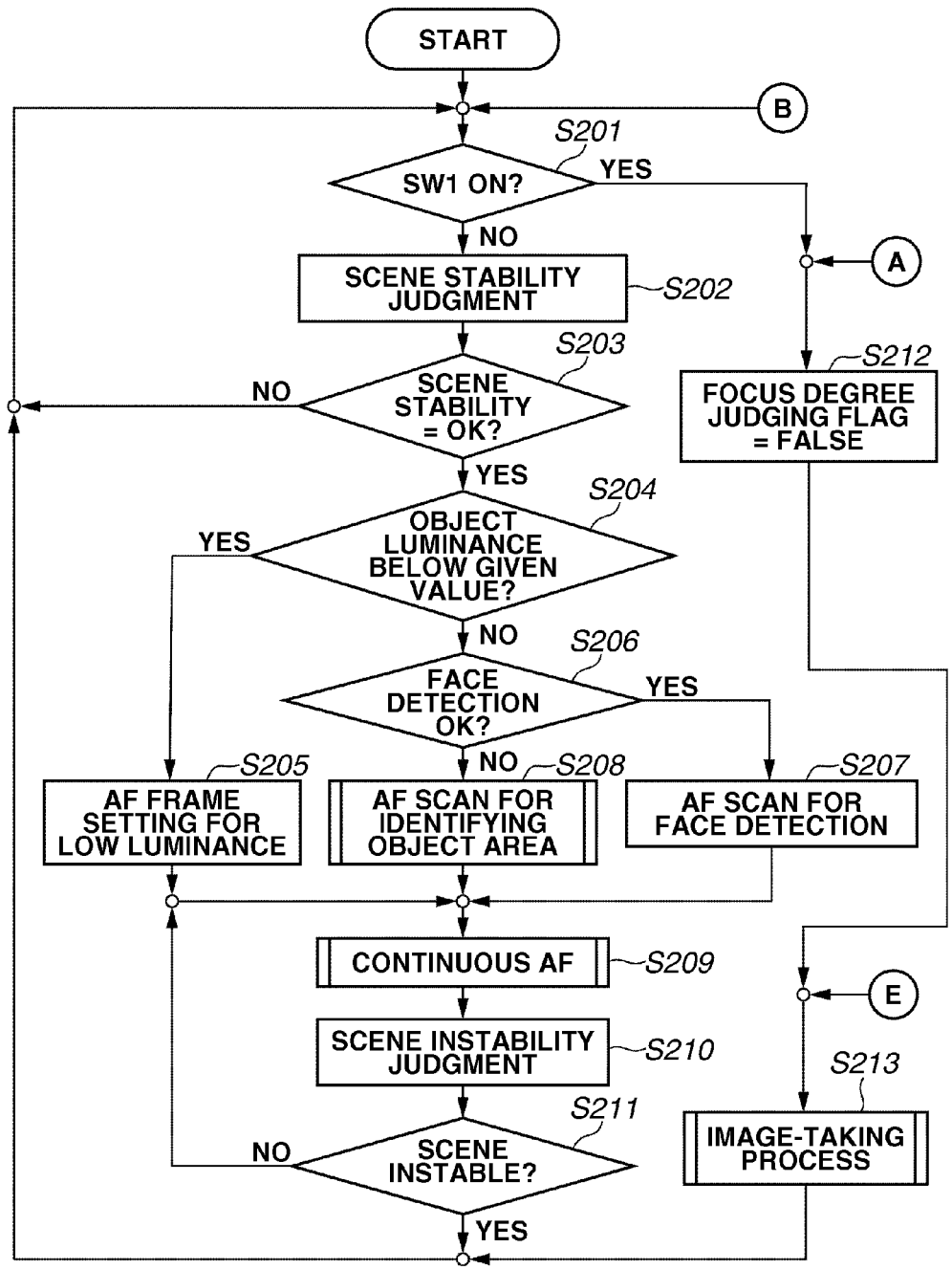
FIG. 2 is a flow chart showing the focus adjusting operation of the embodiment.
Figure 3:
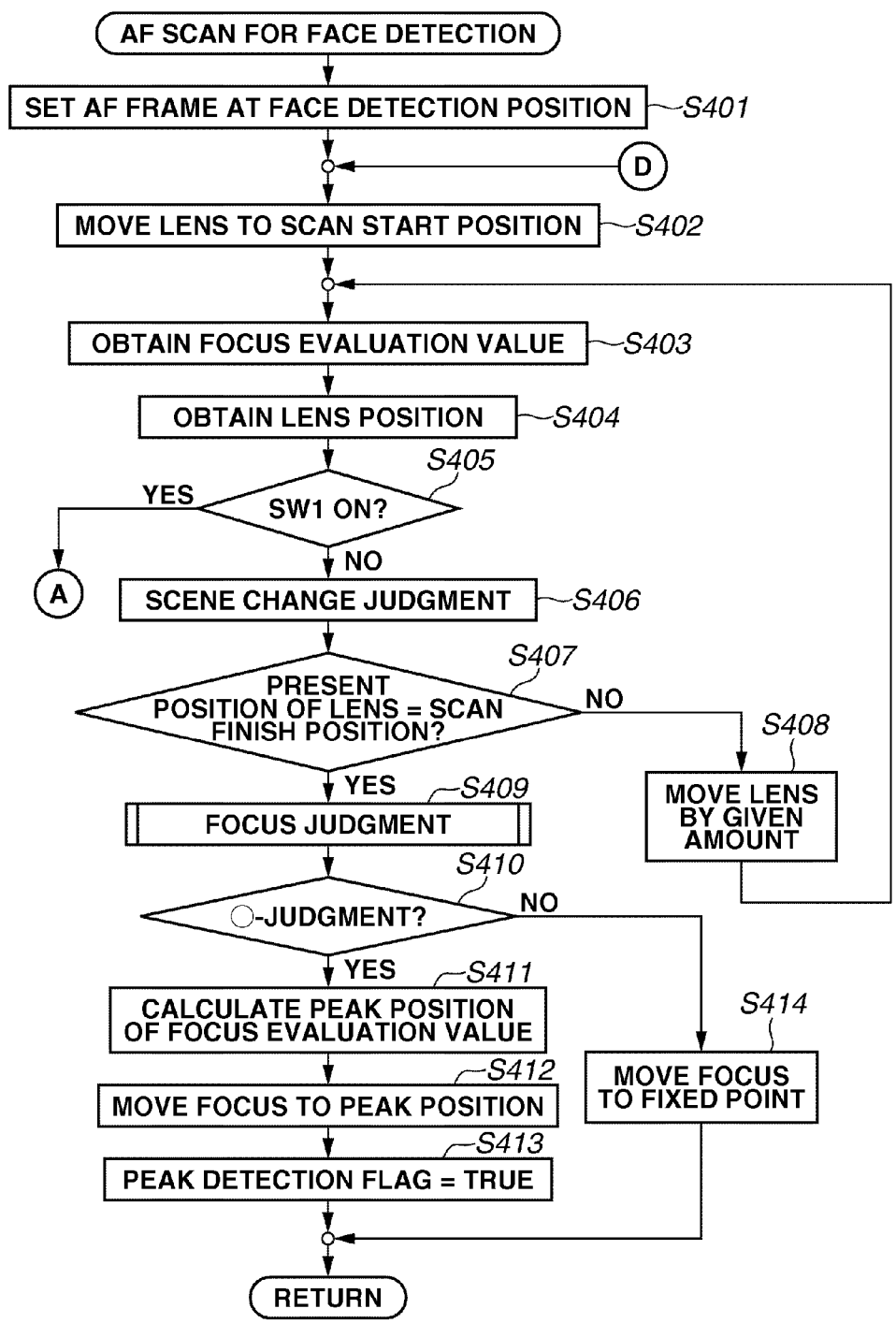
FIG. 3 is a flow chart showing a subroutine of AF scan operation at the time of face detection in FIG. 2.

FIG. 3 is the flow chart of the AF scan at the time of the face detection in step S208 in FIG. 2. In step S401, the AF frame is set based on the face information (position and size) detected by the face detection module 123. In step S402, the AF processing portion 105 moves the focus lens 104 to the scan start position. Here, the scan start position is determined, for example, based on the distance to an object person estimated from the face size detected. In step S403, the CPU 115 stores the focus evaluation value corresponding to the present position of the focus lens 104 in the DRAM 113. In step S404, the CPU 115 obtains data of the present position of the focus lens 104, and stores its data in the DRAM 113. Thus, prior to the first AF scan operation for determining the object area to be focused, the control unit judges a range in which the object area to be focused is likely to exist, based on the detection result obtained by the face detecting unit. And, based on this judgment result, a manner (AF frame setting manner, scan position and range described below and the like) of the first AF scan operation is adjusted.

In step S405, the CPU 115 judges the state (ON/OFF) of SW1 for instructing the image-taking preparation. When the state is ON, the current process is finished, and the step proceeds to step S212 in FIG. 2. When the state is OFF, the step proceeds to step S406. In step S406, the scene change judgment is performed. The scene change judgment is a process in which whether the image-taking scene changes or not is judged from the state of the object or the camera.

In step S407, the CPU 115 checks whether or not the present position of the focus lens 104 coincides with the scan finish position. When both are coincident, the step proceeds to step S409. If not, the step proceeds to step S408. Here, the scan finish position is determined, for example, based on the distance to the object person estimated from the face size detected. In step S408, the AF processing portion 105 moves the focus lens 104 toward the scan finish position by a given amount, and then the step returns to step S403. In step S409, the focus judgment is executed according to procedures described below (see FIG. 4).

In step S410, whether or not the focus judgment in step S409 is the o-judgment is checked. When the focus judgment is the o-judgment, the step proceeds to step S411. If not, the step proceeds to step S414. Here, the o-judgment is made when contrast of the object is sufficient and the object exists within the distance range scanned.

In step S411, the in-focus position at which the focus evaluation value obtained in step S403 is maximum is calculated. In step S412, the AF processing portion 105 moves the focus lens 104 to the in-focus position calculated in step S411. In step S413, the peak detection flag is set to TRUE. The peak detection flag is beforehand set to FALSE.

In step S414, the AF processing portion 105 moves the focus lens 104 to a position (fixed point) stored beforehand in the DRAM 113 since the judgment is not the o-judgment, that is, contrast of the object is insufficient, or the object exists outside the distance range scanned. Here, the fixed point is set to a distance at which the existing probability of the object is high. For example, where the face of a person is detected, the fixed point is a distance of the person estimated from the face size detected.

Figure 5:
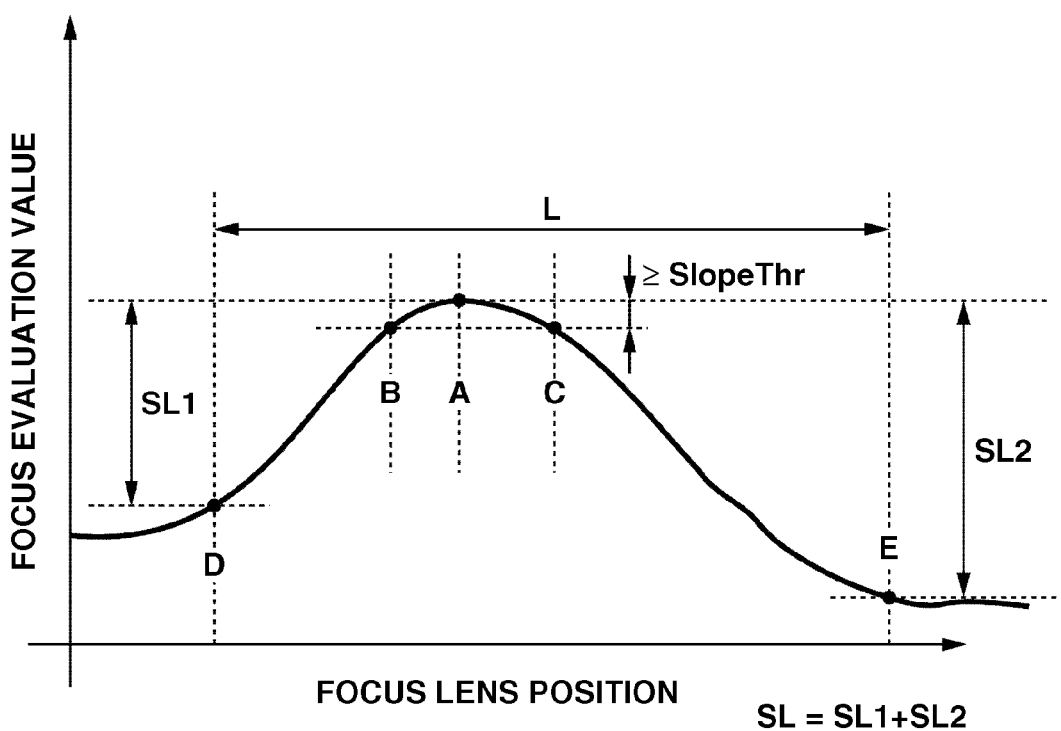
FIG. 5 is a view illustrating a manner of the focus judgment in FIG. 4.

A subroutine of the focus judgment in step S409 in FIG. 3, in step S1201 in FIG. 9, and step S1501 in FIG. 12 described below will be described with reference to FIGS. 4 and 5.

Where the abscissa indicates the focus lens position and the ordinate indicates the focus evaluation value, the focus evaluation value changes in the form of a hill shape as illustrated in FIG. 5, except a case where competition of far and near objects exists, and the like. Accordingly, the focus judgment can be executed by judging the hill shape from a difference between maximum and minimum focus evaluation values, a length of a slope portion whose slope has an inclination above a given value (Slope Thr), and a slope or inclination of the slope portion.

The result in the focus judgment is supplied as the following o-judgment and x-judgment.

o-judgment: Contrast of the object is sufficient, and the object exists in a distance range scanned.

x-judgment: Contrast of the object is insufficient, or the object exists outside the distance range scanned.

Further, in the x-judgment, Δ-judgment is used in a case where the object exists outside the scanned distance range on the wide-angle side.

The length L of the above slope portion and the slope SL/L of the slope portion for judging the hill shape will be described with reference to FIG. 5. SL indicates a hill height of the slope portion. Points D and E indicate points at which the slope can be deemed to continue from a hill top (point A), and L is a hill width between the points D and E. A range over which the slope can be deemed to continue is a range over which scan points with the focus evaluation value lower than that at the point A by above a given amount (Slope Thr) are successively present. The scan point is a point at which the focus evaluation value is to be obtained during continuous move of the focus lens from the scan start point to the scan finish point. The above SL is equal to SL1+SL2 where SL1 is the difference between focus evaluation values at the points A and D and SL2 is the difference between focus evaluation values at the points A and E.

Figure 4:
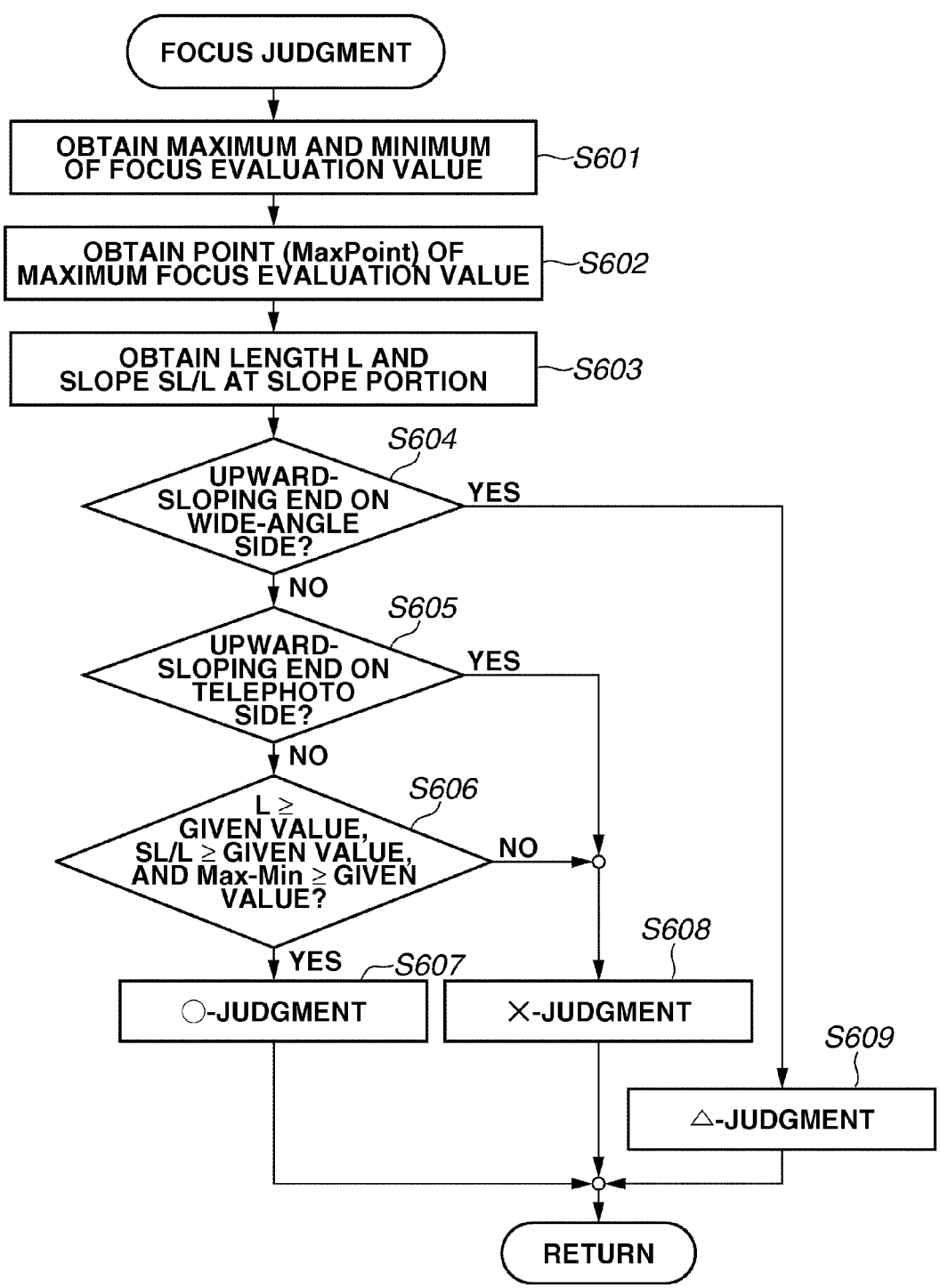
FIG. 4 is a flow chart showing a subroutine of focus judgment in FIGS. 3, 9 and 12.

In the flow chart of FIG. 4, maximum and minimum of the focus evaluation value are obtained in step S601. Then, in step S602, the scan point at which the focus evaluation value culminates is obtained, and the step proceeds to step S603. In step S603, L and SL for judgment of the hill shape are obtained from scan points and focus evaluation values, and the step proceeds to step S604.

In step S604, whether or not the hill shape has an upward-sloping end on the wide-angle side is judged. For positive judgment of the upward-sloping end on the wide-angle side, the following two conditions should be satisfied. One condition is that the scan point at which the focus evaluation value is maximum appears at the end on the wide-angle side in a given scan range. The other condition is that a difference between focus evaluation values at the scan point at the end on the wide-angle side and the scan point located one point away from the end toward the telephoto side is above a given value. When positive judgment of the upward-sloping end on the wide-angle side is made, the step proceeds to step S609. If not, the step proceeds to step S605.

In step S605, whether or not the hill shape has an upward-sloping end on the telephoto side is judged. For positive judgment of the upward-sloping end on the telephoto side, the following two conditions should be satisfied. One condition is that the scan point at which the focus evaluation value is maximum appears at the end on the telephoto side in a given scan range. The other condition is that a difference between focus evaluation values at the scan point at the end on the telephoto side and the scan point located one point away from the end toward the wide-angle side is above a given value. When positive judgment of the upward-sloping end on the telephoto side is made, the step proceeds to step S608. If not, the step proceeds to step S606.

In step S606, in a case where the length L of the slope portion with the inclination above a given value is above a given value, the average value SL/L of the inclination of the slope portion is above a given value, and the difference between maximum (Max) and minimum (Min) focus evaluation values is above a given value, the step proceeds to step S607. If not, the step proceeds to step S608. In step S607, the result is judged to be the o-judgment, since focus evaluation values obtained have the hill shape, the object has the contrast, and the focus adjustment is possible. In step S608, the result is judged to be the x-judgment, since focus evaluation values obtained do not have the hill shape, the object does not have the contrast, and the focus adjustment is impossible. In step S609, the result is judged to be the Δ-judgment, since the upward slope toward the wide-angle side exists although focus evaluation values obtained do not have the hill shape, and there is a possibility that the peak exists on the wide-angle side. The focus judgment is thus performed.

Figure 6:
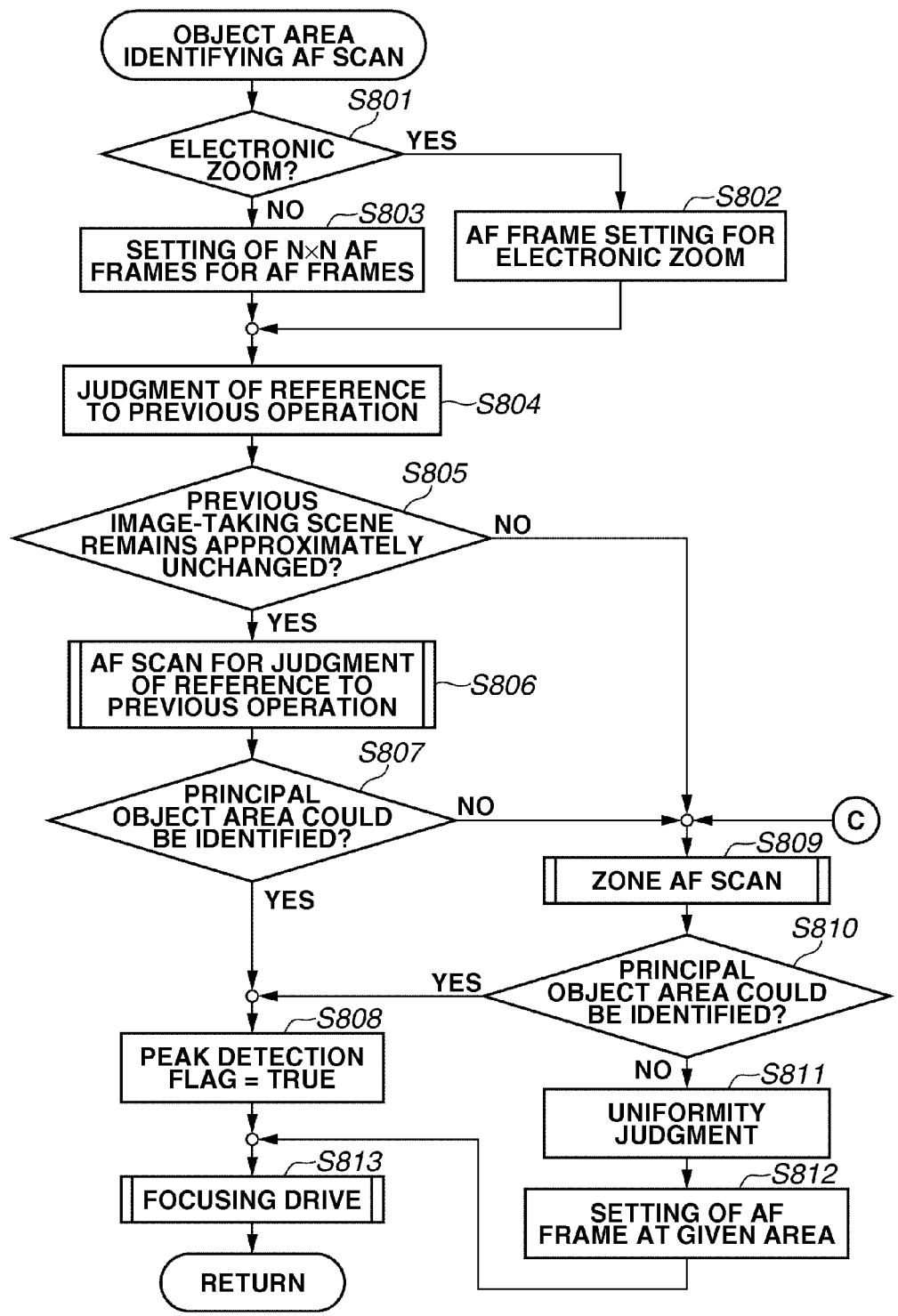
FIG. 6 is a flow chart showing a subroutine of object area identifying or determining AF scan in FIG. 2.

FIG. 6 is the flow chart of the object area identifying or determining AF scan in step S208 in FIG. 2. Herein, the AF scan for determining a principal object area on the image plane is performed.

In step S801, whether or not the electronic zoom is executed is checked. When the electronic zoom is performed, the step proceeds to step S802. If not, the step proceeds to step S803. In step S802, the AF frame setting for the electronic zoom is performed. Here, in the electronic zoom, a central area of the image plane is expanded, and the expanded area is displayed on the operation displaying portion 117. At this time, since a narrow area on the image-pickup element 108 is expanded, the image displayed on the operation displaying portion 117 is composed of pixels whose number is smaller than that of an image at the time the electronic zoom does not executed. Accordingly, if the AF frame setting is conducted so that the frame ratio in the image displayed on the operation displaying portion 117 at the time of the electronic zoom is identical with that at the time when the electronic zoom is not executed, the pixel number in the AF frame at the former time becomes smaller than that at the latter time. Hence, a signal-to-noise ratio of the focus evaluation value decreases at the time of the electronic zoom. Therefore, AF frame settings are made different between those times. In this embodiment, at the time of the electronic zoom, a single AF frame having a give size is set near a central portion of the image plane.

Figure 7:
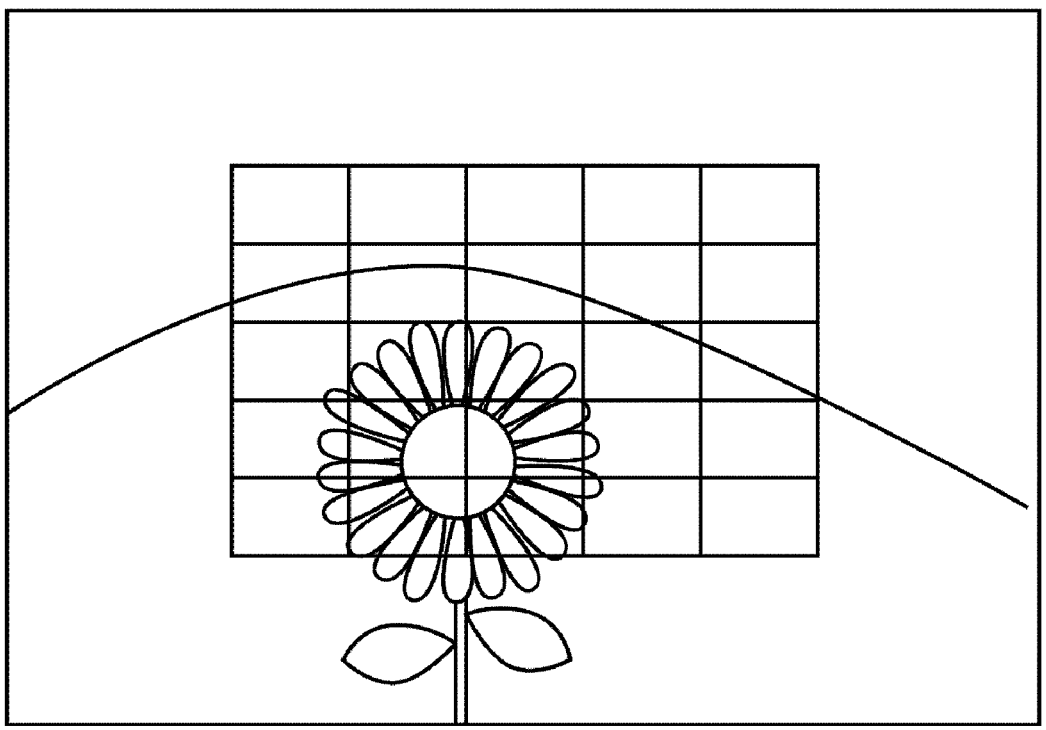
FIG. 7 is a view illustrating an example of AF frame setting in FIG. 6.

In step S803, N*N AF frames are set on the image plane. For example, where N=5 and lengths of the AF frame in horizontal and vertical directions are set to 10 percent of those of the image plane, AF frames are set as illustrated in FIG. 7. N or the AF frame size can be set considering a presence probability of the principal object in the image plane. Further, numbers of AF frames in horizontal and vertical directions can be made different from each other.

In step S804, the judgment of reference to previous operation is performed. In the judgment of reference to previous operation, to what degree the present image-taking scene changes from the image-taking scene previously AF-scanned is judged. This judgment can be executed, for example, by whether or not the object area could be determined in the previous AF scan operation, whether or not the present lens position is closer to the wide-angle end than a given position is, whether or not a time difference between previous and present AF scan operations is within a given time, or whether or not the present attitude of the camera is the same as the previous one.

In step S805, when the present image-taking scene is judged to be about the same as the previous one based on the result of the judgment of reference to previous operation in step S804, the step proceeds to step S806. If not, the step proceeds to step S809. In step S806, the AF scan for the judgment of reference to previous operation is performed according to procedures described below (see FIG. 8). In step S807, whether or not the principal object area could be identified in the AF scan for the judgment of reference to previous operation in step S806 is checked. When the principal object area could be determined, the step proceeds to step S808. If not, the step proceeds to step S809.

In step S808, the peak detection flag is set to TRUE. In step S809, the zone AF scan is performed according to procedures described below (see FIG. 11). In step S810, whether or not the principal object area could be identified in the zone AF scan in step S809 is checked. When the principal object area could be identified, the step proceeds to step S808. If not, the step proceeds to step S811. In step S811, the uniformity judgment is performed.

In the uniformity judgment, examination is performed about the state of a uniform plane in which the image plane has no luminance difference, and the peak of the focus evaluation value cannot be accurately acquired due to lack of contrast even if the AF operation is conducted. In the state of the uniform plane, if the object area identifying AF scan of step S209 in FIG. 2 is repeated each time the image-taking scene becomes stable, variation in the focus state of the image plane is wastefully repeated. This repetition is cumbersome. Therefore, in the uniformity judgment flow, if the state of the uniform plane is detected, the motion of the focus lens 104 is stopped until negative judgment of the state of the uniform plane is made.

In step S812, since the principal object area is not determined in the zone AF scan of step S809, the AF frame is set to a predetermined area set beforehand in the image plane. This predetermined area is an area in which the principal object is likely to exist. Herein, this area is set at a central area of the image plane, for example. In step S813, the focusing drive is executed according to procedures described below (see FIG. 14).

Figure 8:
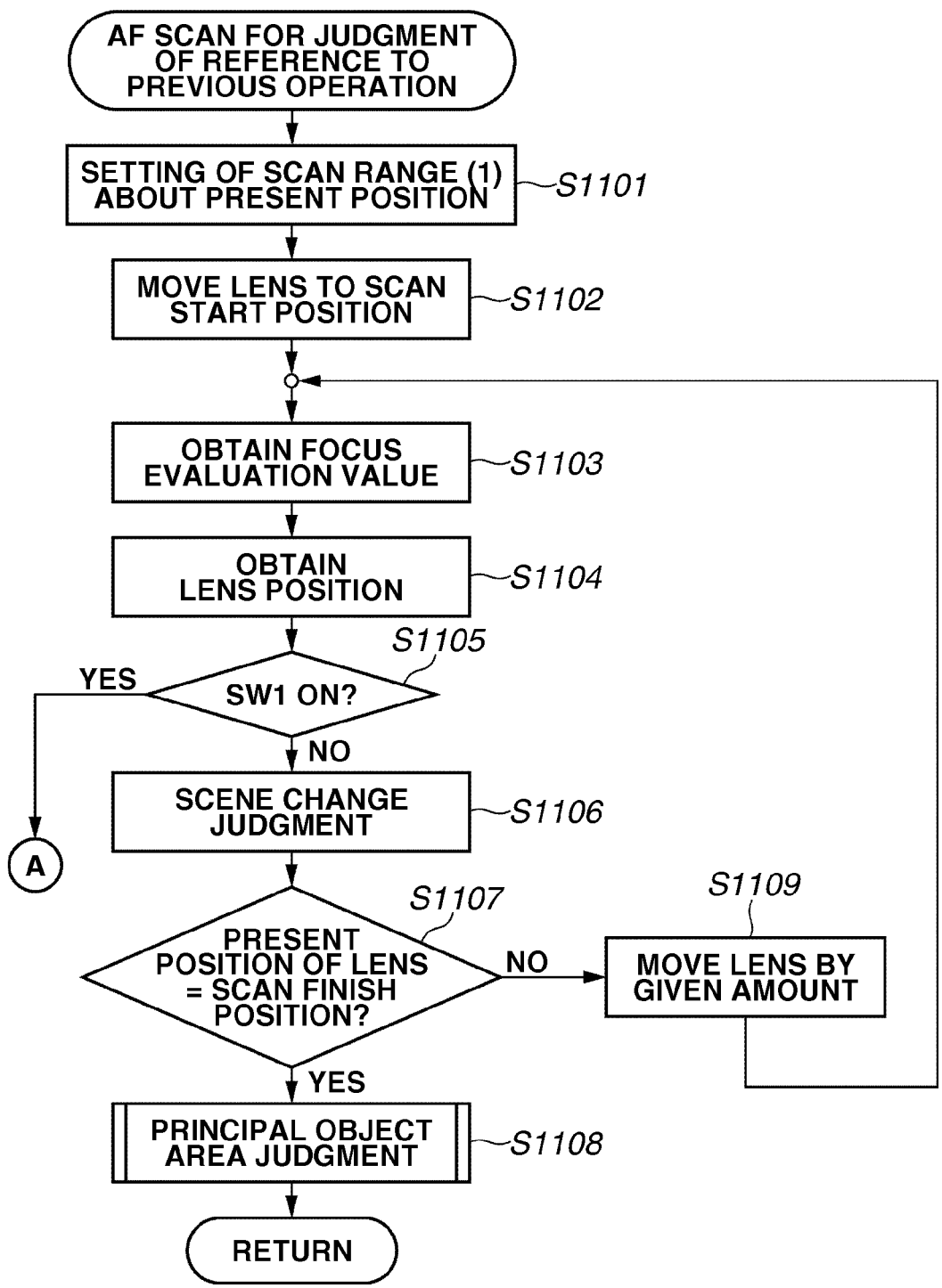
FIG. 8 is a flow chart showing a subroutine of AF scan for judgment of reference to previous operation in FIG. 6.

FIG. 8 is the flow chart of the AF scan for the judgment of reference to previous operation of step S806 in FIG. 6. In step S1101, the scan range is set to a first range about the present position of the focus lens 104. Here, since the scene is judged to be about the same as the previous image-taking scene, the first scan range is a narrow range. In step S1102, the focus lens 104 is moved to the scan start position. In step S1103, the A/D converting portion 109 converts the analog picture image signal read from the image-pickup element 108 into the digital signal, the image processing portion 110 extracts the high frequency component of the luminance signal from the digital signal, and the high frequency component is stored as the focus evaluation value by the CPU 115. In step S1104, the CPU 115 obtains the present position of the focus lens 104, and executes storage of data of this position.

In step S1105, the CPU 115 judges the state (ON/OFF) of SW1 for performing instructions for the image-taking preparation. When the state is ON, the current process is finished, and the step proceeds to step S212 in FIG. 2. When the state is OFF, the step proceeds to step S1106. In step S1106, the scene change judgment is executed. In step S1107, the CPU 115 checks whether or not the present position of the focus lens 104 is coincident with the scan finish position. When both positions are coincident with each other, the step proceeds to step S1108. If not, the step proceeds to step S1109. In step S1108, the principal object area judgment described below is performed (see FIG. 9). In step S1109, the AF processing portion 105 moves the focus lens 104 toward the scan finish direction by a given amount, and then the step returns to step S1103.

Figure 9:
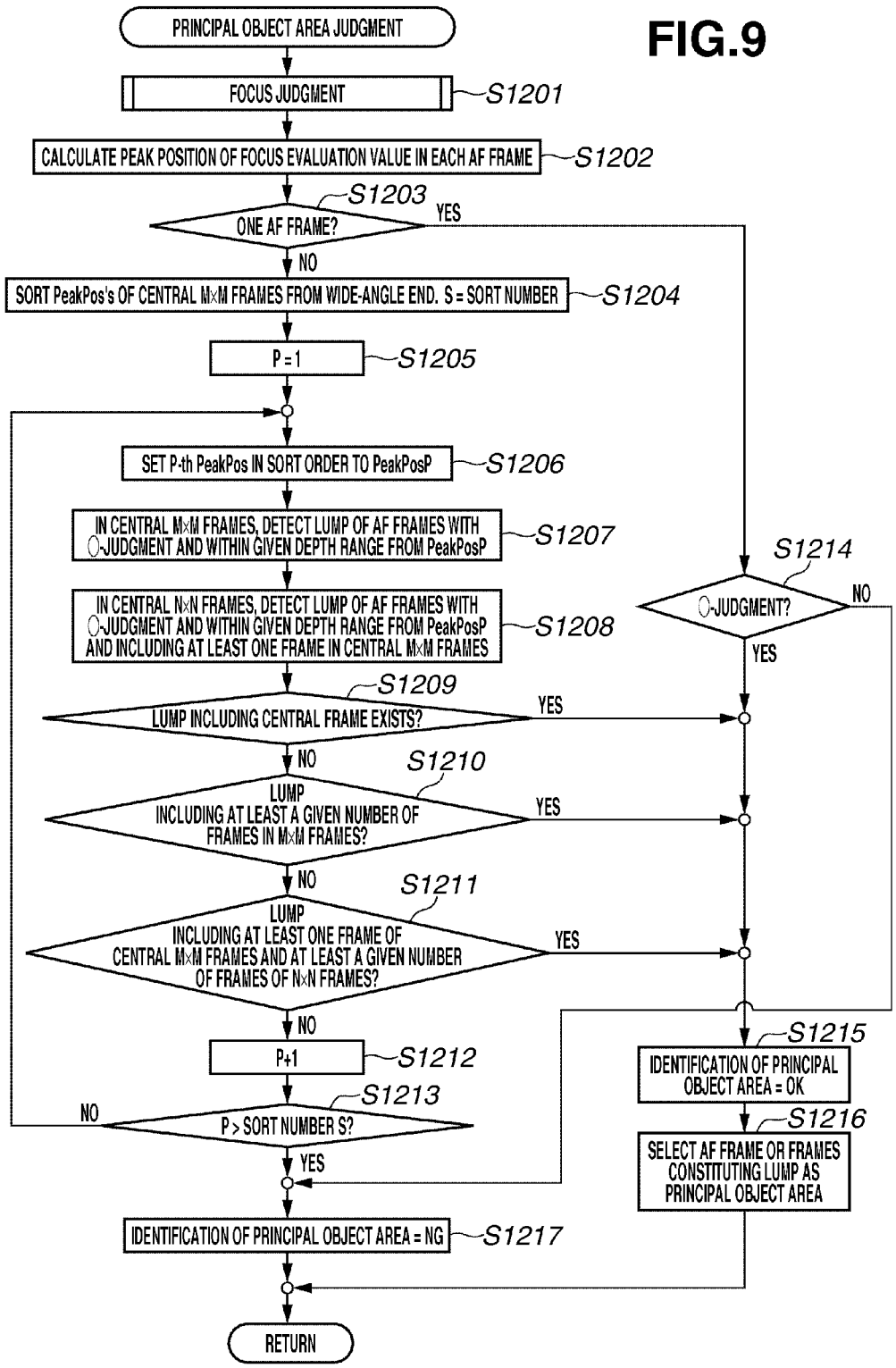
FIG. 9 is a flow chart showing a subroutine of principal object area judgment in FIGS. 10 and 11 of the first embodiment.
Figure 10A:
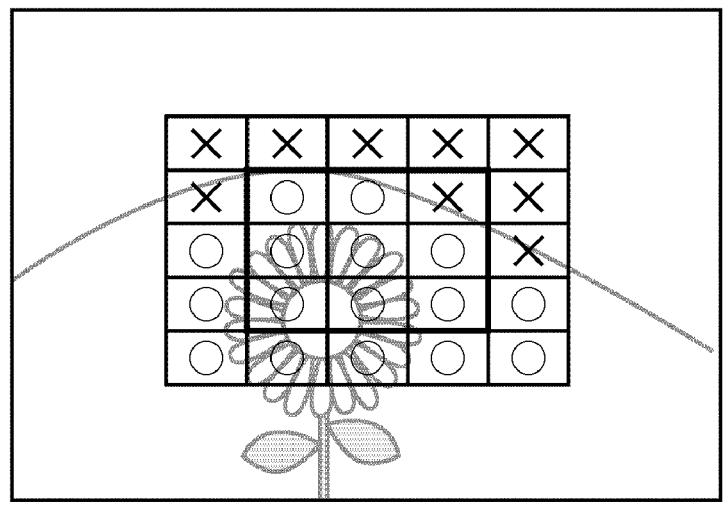
FIGS. 10A to 10C are views illustrating the principal object area judgment in FIG. 9.
Figure 10B:
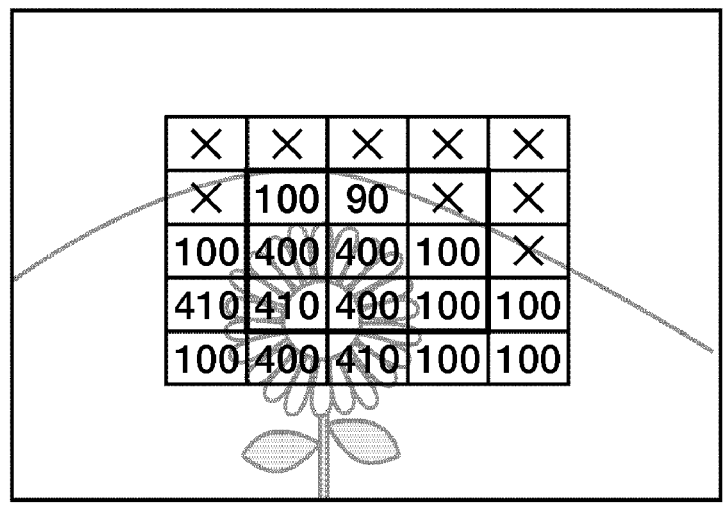
Figure 10C:
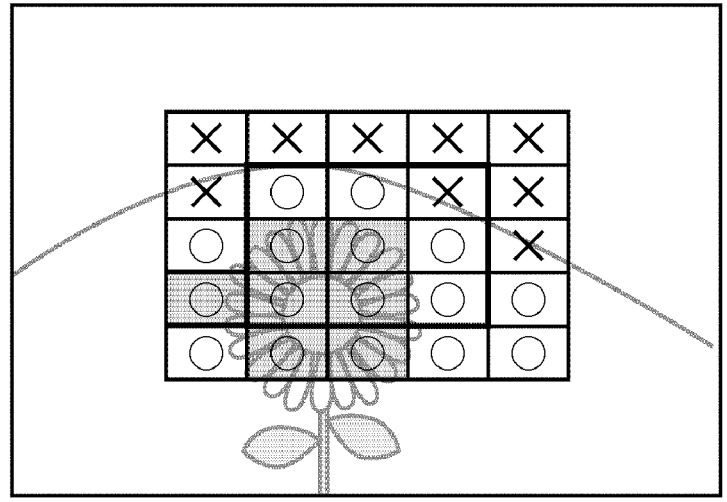

FIG. 9 is the flow chart of the principal object area judgment of step S1108 in FIG. 8 and step S1411 in FIG. 11 described below. In the principal object area judgment, whether or not the principal object area in the image plane could be determined is judged. FIGS. 10A to 10C illustrate an example of the principal object area judgment in FIG. 9. In this example, the size of the AF frame is set to 10 percent of the image plane, N=5, the scan range is set to a range from zero (0) to 500, and a given depth range is set to ±10. Here, numerals of the scan range and the given depth range are numerals for representing the position of the focus lens 104. These correspond to pulse numbers of a stepping motor (not shown) used as the driving motor for the focus lens 104, and their values increase as the focus lens 104 approaches the wide-angle end.

In step S1201, the above-described focus judgment in FIG. 4 is performed for every AF frame set. For example, in every AF frame, the focus judgment result is assumed to be one illustrated in FIG. 10A. In step S1202, the peak position (PeakPos) of the focus evaluation value in each AF frame is calculated and stored. For example, for every AF frame, the peak position calculation result is assumed to be one illustrated in FIG. 10B. In step S1203, whether or not the number of AF frames is one (1) is checked. When a single AF frame is set, the step proceeds to step S1214. If not, the step proceeds to step S1204.

In step S1204, PeakPos's of AF frames in central M*M frames are sorted from the wide-angle end. The number of sort is represented by S. In the following description, it is assumed that M=3. Nine (3*3) frames surrounded by the thick solid line in FIGS. 10A to 10C exhibit the central M*M frames. Here, the peak position of the AF frame with the x-judgment judged in the focus judgment of step S1201 cannot be calculated, so that such an AF frame is excluded from AF frames to be sorted. For example, in the case of FIG. 10B, the sort result from the wide-angle end is indicated as 410, 400, 400, 400, 100, 100, 100 and 90, and the sort number S is S=8.

In step S1205, the count P for showing the order from the wide-angle end of peak positions in the M*M frames calculated in step S1202 is set to one (1). In step S1206, the P-th PeakPos in the sort order is set to PeakPosP. For example, in the case of FIG. 10B, when P=1, PeakPosP=410. In step S1207, in the central M*M AF frames, a lump of AF frames with the o-judgment and within a given depth range from the frame of PeakPosP is detected, and the number and positions of AF frames constituting the lump are stored. Here, in the lump, AF frames satisfying conditions are adjoining each other in horizontal and vertical directions, for example. In a case where there are plural lumps, one of them can be selected considering numbers of AF frames and positions of the respective lumps.

In step S1208, in central N*N AF frames, a lump of AF frames with the o-judgment and within a given depth range from the frame of PeakPosP is detected so that at least one frame in the central M*M AF frames is involved in the above lump. And, the number and positions of AF frames constituting this lump are stored. For example, in the case of judgment results as illustrated in FIGS. 10A and 10B, the lump including frames in gray illustrated in FIG. 10C is detected.

In step S1209, whether or not the lump detected in step S1207 or S1208 includes a central frame is checked. When the lump includes the central frame, the step proceeds to step S1215. If not, the step proceeds to step S1210. In step S1210, whether or not the lump detected in step S1207 or S1208 includes at least a given number of frames in the M*M frames is checked. When the lump includes such frame or frames, the step proceeds to step S1215. If not, the step proceeds to step S1211. In step S1211, whether or not the lump detected in step S1207 or S1208 includes at least one frame of the central M*M frames and at least a given number of frame or frames of the N*N frames is checked. When the lump includes such frames, the step proceeds to step S1215. If not, the step proceeds to step S1212. In step S1212, one (1) is added to the count P. In step S1213, whether or not the count P is larger than the sort number S is checked. When the count P is larger than the sort number S, the step proceeds to step S1217. If not, the step returns to step S1206.

In step S1214, whether or not the focus judgment result in step S1201 is the o-judgment is checked. When the result is the o-judgment, the step proceeds to step S1215. If not, the step proceeds to step S1217. In step S1215, positive judgment of determination of the principal object area is made. In step S1216, AF frame or frames constituting the lump is judged to be the principal object area and selected, and the current judgment process is finished. In a case where the thus-set AF frame includes only one (1) frame, this one frame is selected. In step S1217, it is judged that the principal object area could not be determined, and the current judgment process is finished.

Figure 11:
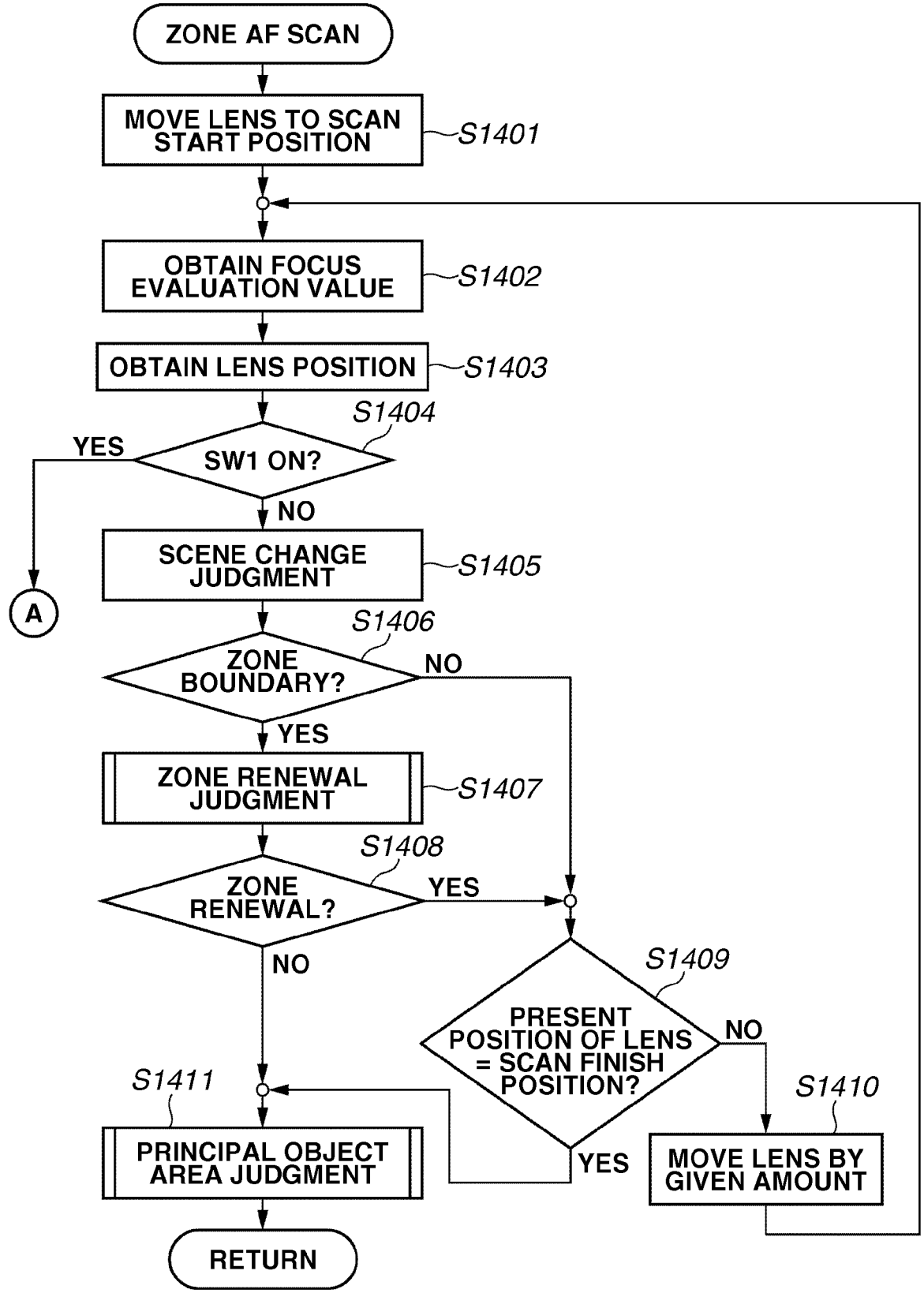
FIG. 11 is a flow chart showing a subroutine of zone AF scan in FIG. 6.

FIG. 11 is the flow chart of the zone AF scan of step S809 in FIG. 6. The zone means each range of plural ranges formed by dividing the focusable distance range.

In step S1401, the focus lens 104 is moved to the scan start position. Here, the scan start position is, for example, the position at the telephoto end. In step S1402, the A/D converting portion 109 converts the analog picture image signal read from the image-pickup element 108 into the digital signal, the image processing portion 110 extracts the high frequency component of the luminance signal from the digital signal, and the CPU 115 executes storage of the high frequency component as the focus evaluation value. In step S1403, the CPU 115 obtains the present position of the focus lens 104, and executes storage of data of this position.

In step S1404, the CPU 115 judges the state (ON/OFF) of SW1 for performing instructions for the image-taking preparation. When the state is ON, the current process is finished, and the step proceeds to step S212 in FIG. 2. When the state is OFF, the step proceeds to step S1405. In step S1405, the scene change judgment is executed. In step S1406, the CPU 115 checks whether or not the present position of the focus lens 104 is coincident with the boundary position of the zone set beforehand. When both positions are coincident with each other, the step proceeds to step S1407. If not, the step proceeds to step S1409. In step S1407, the zone renewal judgment is performed according to procedures described below (see FIG. 12). Here, the zone renewal means to scan a new zone subsequent to the scan of a zone adjoining the new zone.

In step S1408, whether or not the zone renewal is decided to be performed based on the judgment result in step S1407 is checked. When the zone renewal is decided to be performed, the step proceeds to step S1409. If not, the step proceeds to step S1411. In step S1409, the CPU 115 checks whether or not the present position of the focus lens 104 is coincident with the scan finish position. When both positions are coincident with each other, the step proceeds to step S1411. If not, the step proceeds to step S1410. In step S1410, the focus lens 104 is moved toward the scan finish direction by a given amount, and then the step returns to step S1402. In step S1411, the above principal object area judgment in FIG. 9 is performed.

Figure 12:
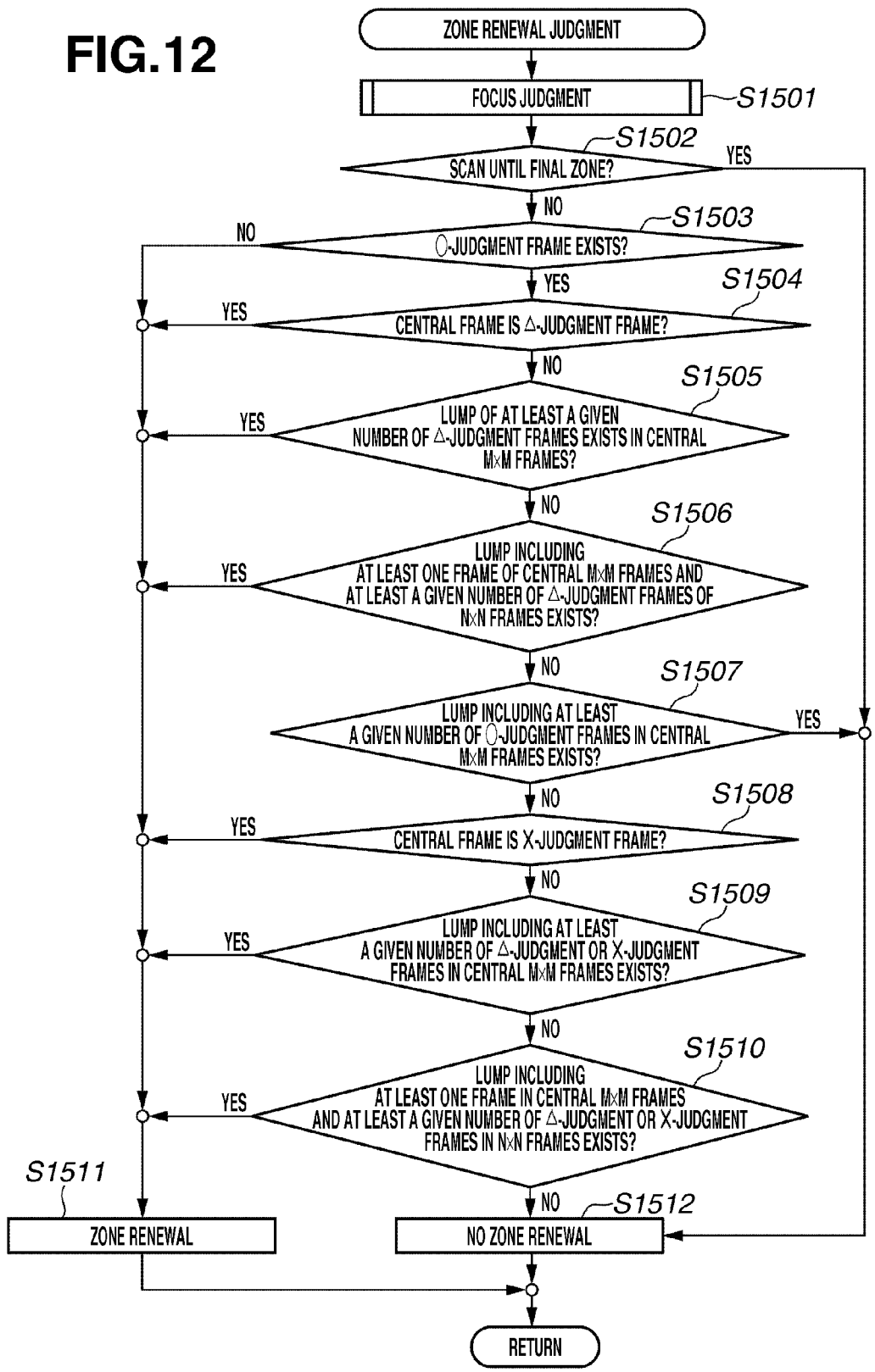
FIG. 12 is a flow chart showing a subroutine of zone renewal judgment in FIG. 11.
Figure 13A:
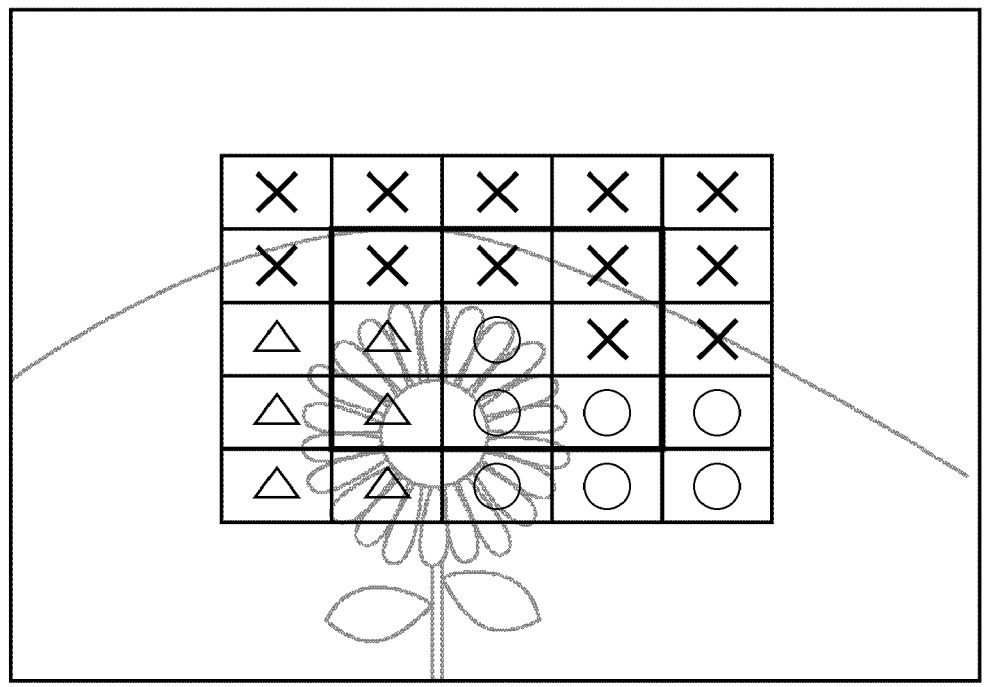
FIGS. 13A and 13B are views illustrating an example of the zone renewal judgment in FIG. 12.
Figure 13B:
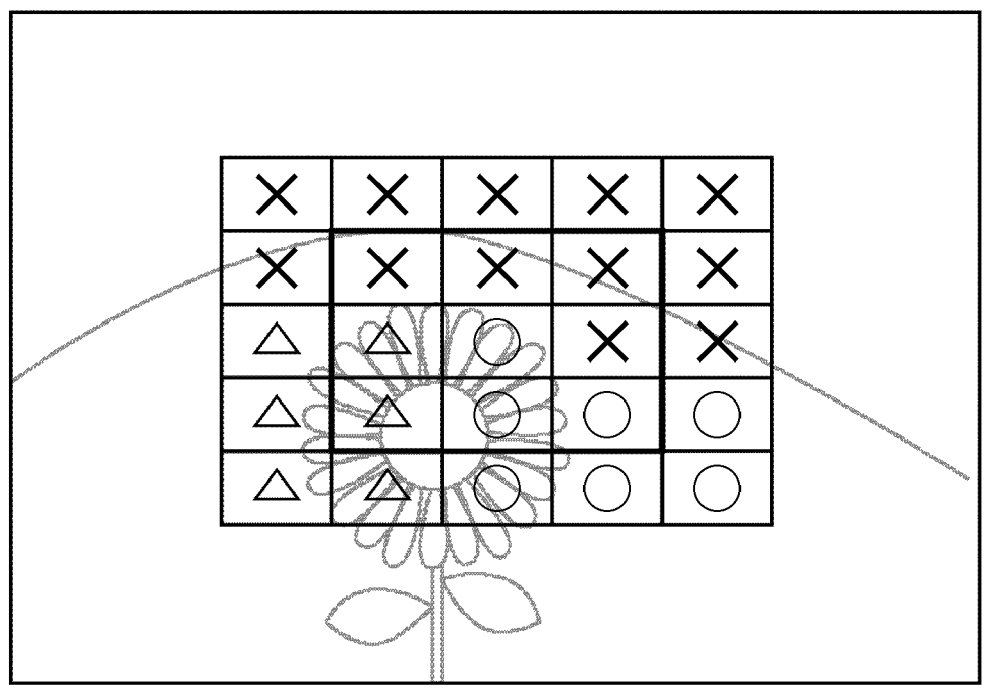

FIG. 12 is the flow chart of the zone renewal judgment of step S1407 in FIG. 11. In the zone renewal judgment, whether or not the principal object is likely to exist in a position forward in the scan direction is judged. That is, whether or not the AF scan is to be continued is judged. FIGS. 13A and 13B illustrate an example of the zone renewal judgment in FIG. 12. In this example, the size of the AF frame is set to ten (10) percent of the image plane, N=5 and M=3.

In step S1501, the above focus judgment in FIG. 4 is performed for every AF frame set. For example, the focus judgment result as illustrated in FIG. 13A is assumed to be obtained in every AF frame. In step S1502, whether or not the scan is performed onward to the final zone is checked. When the scan is performed until the final zone, the step proceeds to step S1512. If not, the step proceeds to step S1503. In step S1503, whether or not the o-judgment frame exists is checked. When the o-judgment frame exists, the step proceeds to step S1504. If not, the step proceeds to step S1511.

In step S1504, whether or not the judgment of the central frame is the Δ-judgment is checked. When the judgment of the central frame is the Δ-judgment, the step proceeds to step S1511. If not, the step proceeds to step S1505. In step S1505, whether or not a lump of at least a given number of Δ-judgment frames exists in the central M*M frames is checked. When the lump exists, the step proceeds to step S1511. If not, the step proceeds to step S1506. In the example of FIGS. 13A and 13B, this given number is set to two (2). In step S1506, whether or not a lump including at least a given number of Δ-judgment frame or frames of the N*N frames so that at least one frame of the central M*M frames is involved exists is checked. When such a lump exists, the step proceeds to step S1511. If not, the step proceeds to step S1507. In the example of FIGS. 13A and 13B, this given number is set to four (4). In step S1507, whether or not a lump including at least a given number of o-judgment frame or frames in the central M*M frames exists is checked. When such a lump exists, the step proceeds to step S1512. If not, the step proceeds to step S1508. In the example of FIGS. 13A and 13B, this given number is five (5).

In step S1508, whether or not the central frame is the x-judgment frame is checked. When the central frame is the x-judgment frame, the step proceeds to step S1511. If not, the step proceeds to step S1509. In step S1509, whether or not a lump including at least a given number of Δ-judgment or x-judgment frame or frames in the central M*M frames exists is checked. When such a lump exists, the step proceeds to step S1511. If not, the step proceeds to step S1510. In the example of FIGS. 13A and 13B, this given number is set to two (2). In step S1510, whether or not the lump including at least a given number of Δ-judgment or x-judgment frame or frames in the N*N frames exists so that at least one frame in the central M*M frames is involved is checked. When such a lump exists, the step proceeds to step S1511. If not, the step proceeds to step S1512. In the example of FIGS. 13A and 13B, this given number is four (4). In step S1511, it is judged that the zone renewal is to be performed, and the current judgment process is finished. In step S1512, it is judged that the zone renewal is not to be performed, and the current judgment process is finished.

For example, in the case of N=5 and M=3, the lump is an area illustrated in gray in FIG. 13B, and it is judged that the zone renewal is to be performed.

Figure 14:
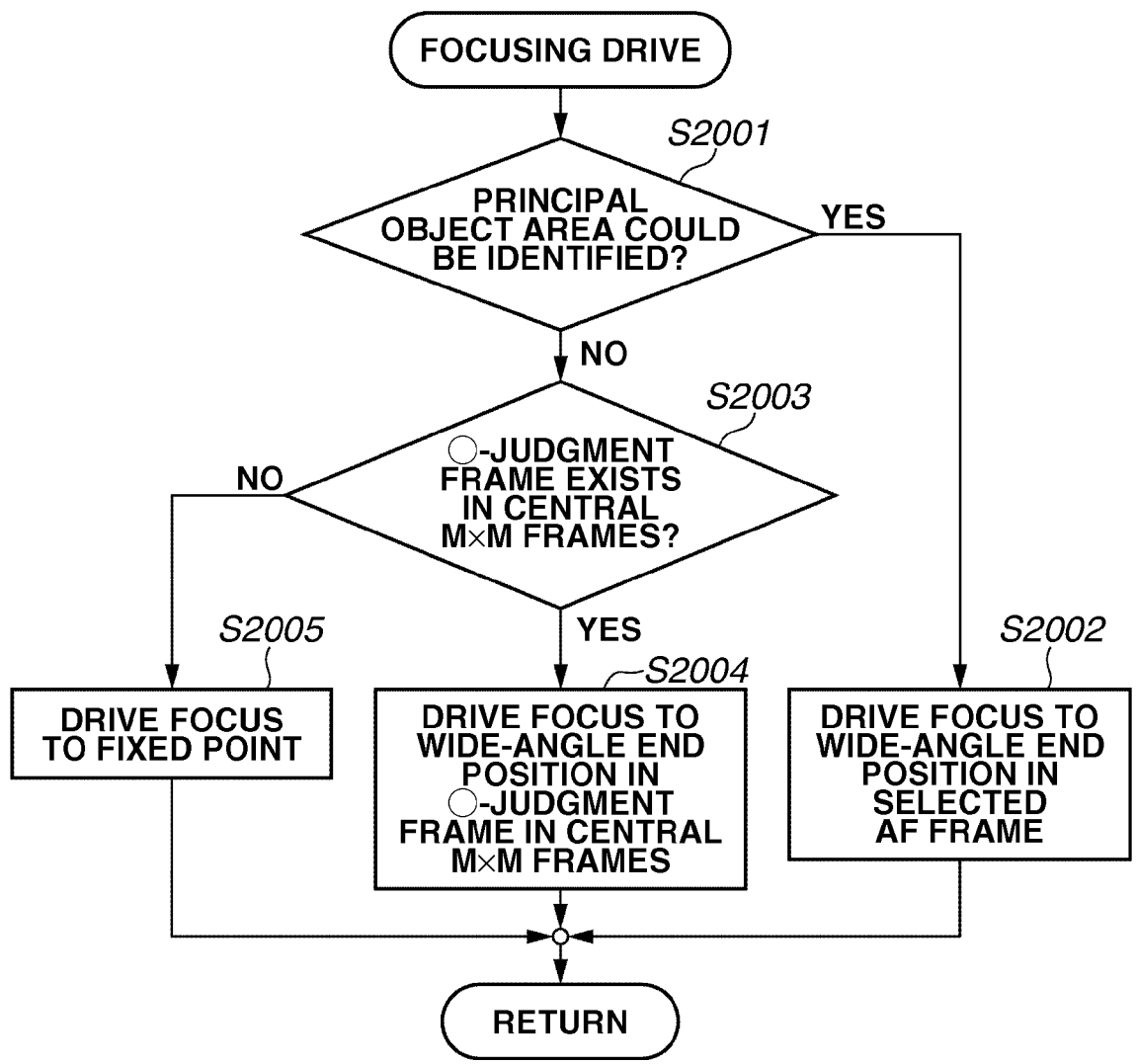
FIG. 14 is a flow chart showing a subroutine of focusing drive in FIG. 6.

FIG. 14 is the flow chart of the focusing drive of step S813 in FIG. 6. In step S2001, whether or not the principal object area could be identified is checked. When the principal object area could be determined, the step proceeds to step S2002. If not, the step proceeds to step S2003. In step S2002, the focus is driven to the wide-angle end position in the selected AF frame, and the current process is finished. In step S2003, whether or not the o-judgment frame exists in the central M*M frames is checked. When the o-judgment frame exists, the step proceeds to step S2004. If not, the step proceeds to step S2005. In step S2004, the focus is driven to the wide-angle end position in the o-judgment frame in the central M*M frames, and the current process is finished. In step S2005, the focus lens is driven to a position (fixed point) stored beforehand, and the current process is finished. Here, the fixed point is, for example, a distance position with a high existing probability of the object.

Figure 15:
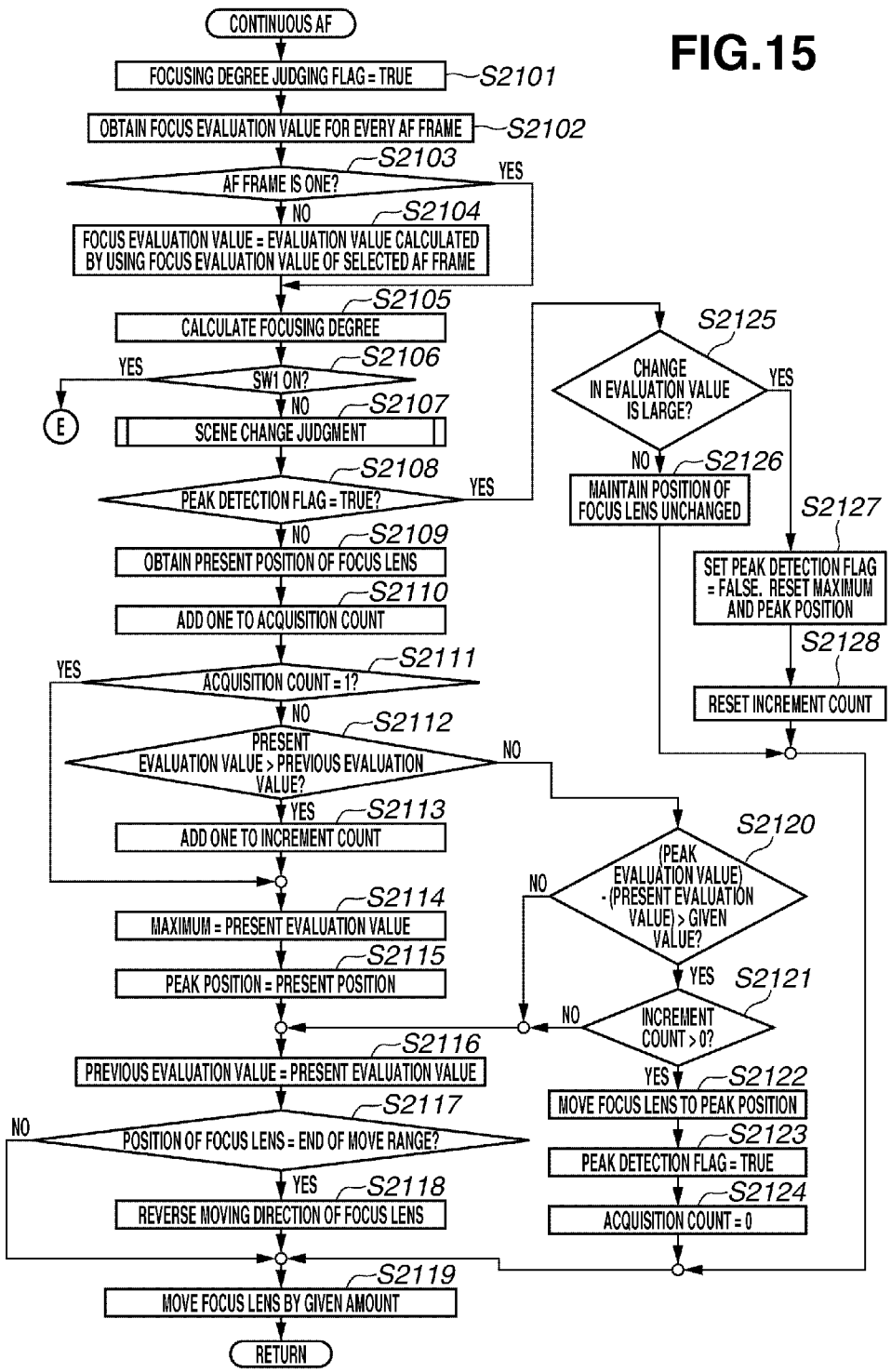
FIG. 15 is a flow chart showing a subroutine of the continuous AF in FIG. 2.

FIG. 15 is the flow chart of the continuous AF of step S209 in FIG. 2. In step S2101, the focusing degree judging flag is set to TRUE. In step S2102, the focus evaluation value is obtained in every AF frame set.

In step S2103, whether or not the number of AF frames set is one (1) is checked. When the AF frame is one, the step proceeds to step S2105. If not, the step proceeds to step S2104. In step S2104, the evaluation value calculated by using the focus evaluation value of the AF frame selected as the principal object area is re-set as the focus evaluation value to be used in step S2105 onward. Thereby, even if the image-taking scene changes and the principal object area in the image plane changes, the focus evaluation value of the principal object area in the image plane can be calculated.

In step S2105, the focusing degree is calculated based on the focus evaluation value. In this embodiment, based on the focus evaluation value, the focusing degree is classified into high, medium and low degrees. In step S2106, the CPU 115 judges the state (ON/OFF) of SW1 for performing instructions for image-taking preparation. When the state is ON, the current process is finished, and the step proceeds to step S213 in FIG. 2. When the state is OFF, the step proceeds to step S2107. In step S2107, scene change judgment is performed.

In step S2108, whether or not the peak detection flag is TRUE is checked. When TRUE, the step proceeds to step S2125. When FALSE, the step proceeds to step S2109. In step S2109, the present position of the focus lens 104 is acquired. In step S2110, one (1) is added to the acquisition count for counting acquisitions of the focus evaluation value and the present position of the focus lens 104. This count is assumed to be beforehand set to zero (0) in an initializing operation. In step S2111, whether or not the value of the acquisition count is one (1) is checked. When this value is one, the step proceeds to step S2114. If not, the step proceeds to step S2112.

In step S2112, whether or not the present focus evaluation value is larger than the previous focus evaluation value is checked. When the former is larger than the latter, the step proceeds to step S2113. If not, the step proceeds to step S2120. In step S2113, one (1) is added to the increment count. In step S2114, the present focus evaluation value is set as the maximum of the focus evaluation value, and stored in an operational memory (not shown) built in the CPU 115. In step S2115, the present position of the focus lens 104 is set as the position corresponding to the peak of the focus evaluation value, and stored in the operational memory built in the CPU 115. In step S2116, the present focus evaluation value is set as the previous focus evaluation value, and stored in the operational memory built in the CPU 115. In step S2117, whether or not the present position of the focus lens 104 is at the end of the focus lens move range is checked. When the present position is at the end, the step proceeds to step S2118. If not, the step proceeds to step S2119. In step S2118, the moving direction of the focus lens 104 is reversed. In step S2119, the focus lens 104 is moved by a given amount.

In step S2120, whether or not "(maximum of focus evaluation value)−(present focus evaluation value)" is larger than a given value is checked. When this difference is larger than a given value, the step proceeds to step S2121. If not, the step proceeds to step S2116. Here, if this difference is larger than a given value, i.e, the present focus evaluation value is smaller than the maximum value by a given value, the maximum value is deemed as the value corresponding to the focus peak position. In step S2121, whether or not the increment count is larger than zero (0) is checked. When the increment count is larger than zero, the step proceeds to step S2122. If not, the step proceeds to step S2116. In step S2122, the focus lens 104 is moved to the peak position corresponding to the maximum of the focus evaluation value stored in step S2115. In step S2123, the peak detection flag is set to TRUE. In step S2124, the acquisition count is set to zero (0).

In step S2125, whether or not the present focus evaluation value changes from the maximum of the focus evaluation value by above a given ratio is checked. When the present focus evaluation value changes by above a given ratio, the step proceeds to step S2127. If not, the step proceeds to step S2126. In step S2126, the position of the focus lens 104 is maintained unchanged. In step S2127, in order to seek again the position of the focus lens at which the focus evaluation value becomes maximum, the peak detection flag is set to FALSE, and the maximum of the focus evaluation value and the peak position are reset. In step S2128, the increment count is reset.

As described above, in the continuous AF operation, the focus lens is driven so that the principal object is kept in the in-focus state.

Figure 16:
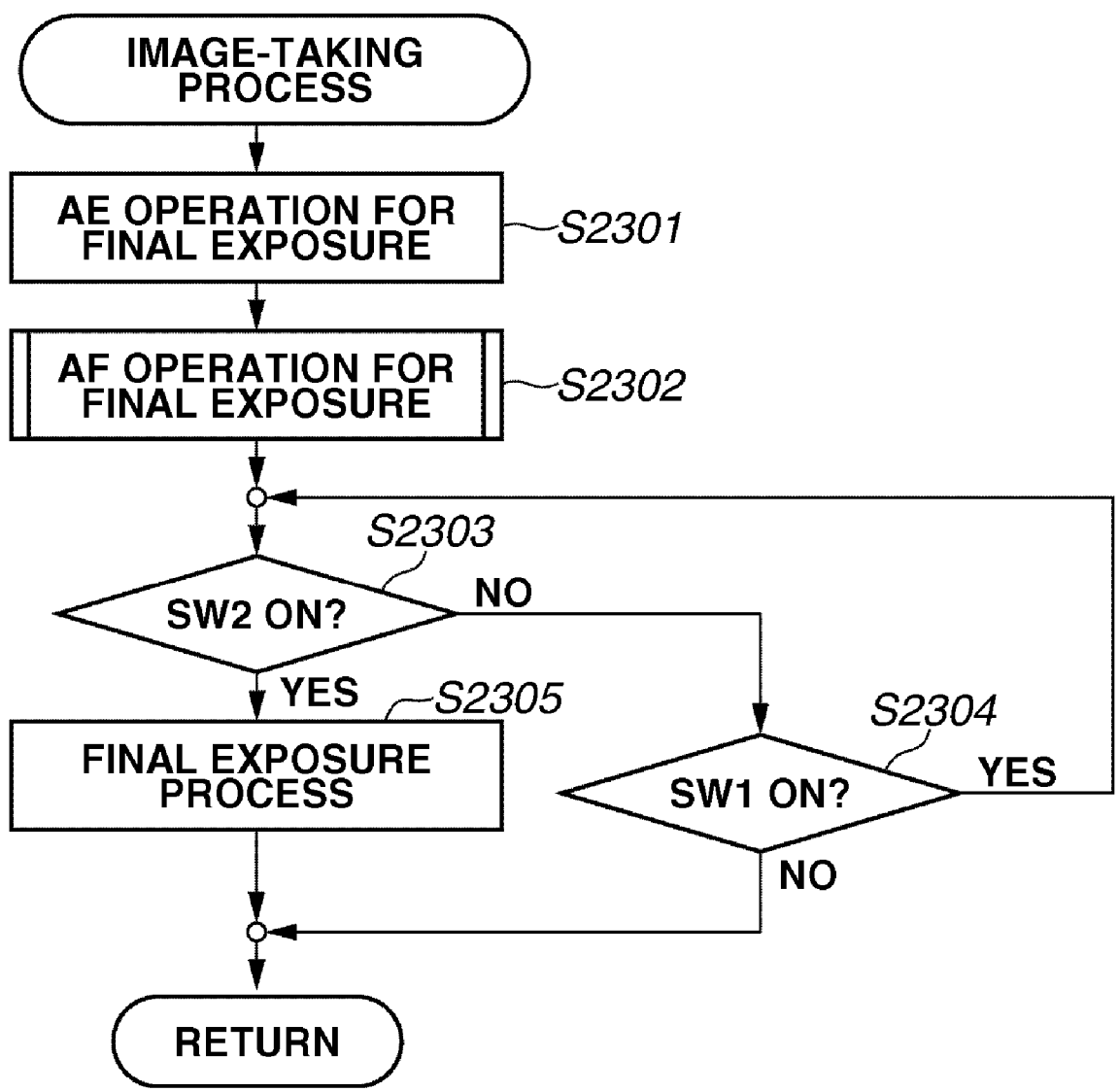
FIG. 16 is a flow chart showing a subroutine of image-taking process in FIG. 2.

FIG. 16 is the flow chart of the image-taking process of step S213 in FIG. 2. In step S2301, the AE processing portion 103 performs the AE process for final exposure. In step S2302, the AF operation for final exposure is performed according to procedures described below (see FIG. 17). In step S2303, the CPU 115 judges the state (ON/OFF) of the image-taking switch SW2 (122). When the state is ON, the step proceeds to step S2305. When the state is OFF, the step proceeds to step S2304. In step S2304, the state (ON/OFF) of SW1 for performing instructions for image-taking preparation is judged. When the state is ON, the step proceeds to step S2303. When the state is OFF, the current process is finished. In step S2305, the final exposure process is performed, and the current process is finished. The final exposure process is performed as follows. Data accumulated in the image-pickup element 108 is read subsequent to exposure of the image-pickup element 108. The A/D converting portion 109 converts the analog signal read from the image-pickup element 108 into the digital signal. The image processing portion 110 executes various kinds of image processes to the digital signal output from the A/D converting portion 109. The thus-processed image is compressed according to a format, such as JPEG, under the control of the CPU 115. And, the compressed data is supplied to the image recording portion 114 and recorded therein under the control of the CPU 115.

Figure 17:
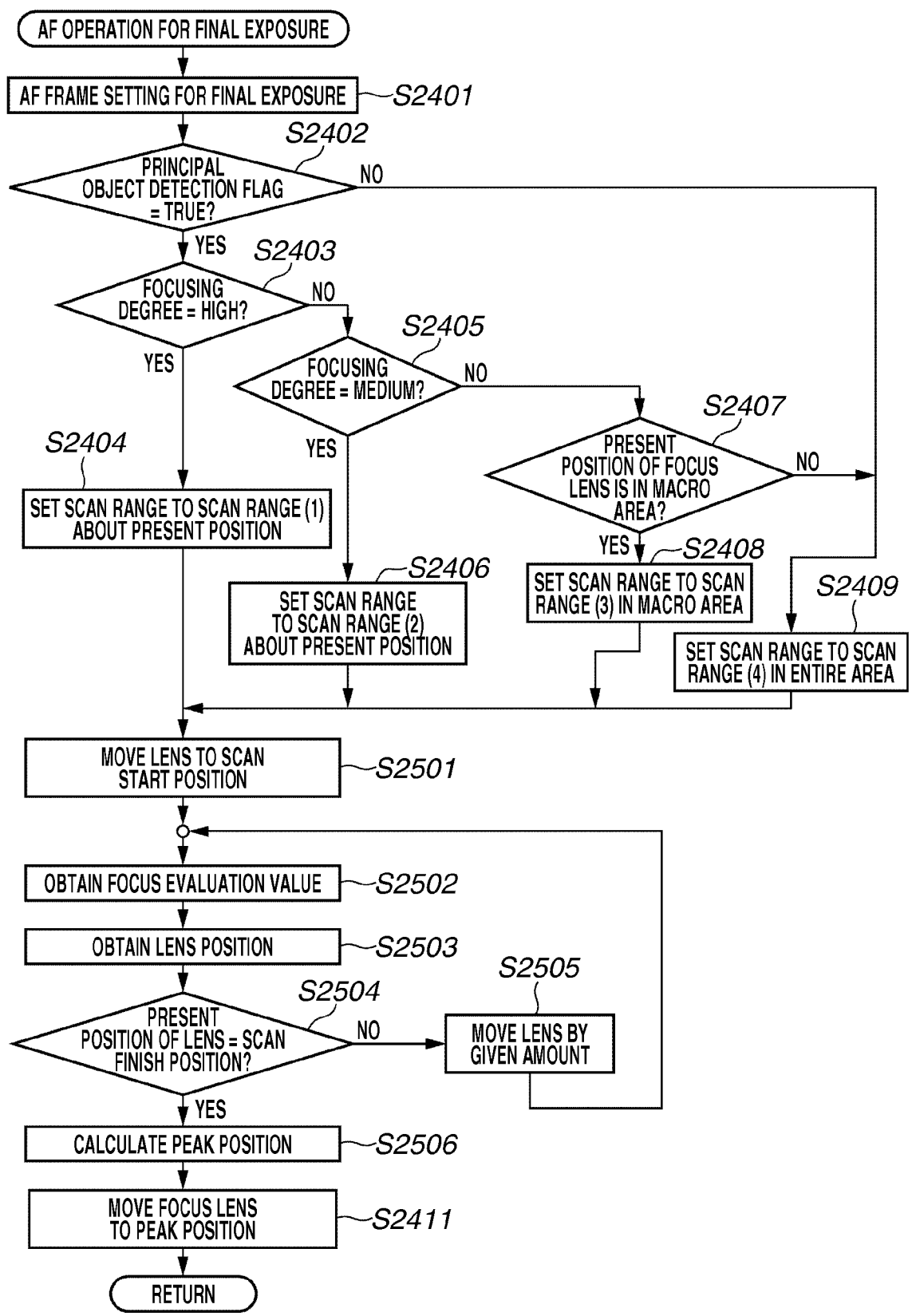
FIG. 17 is a flow chart showing a subroutine of AF operation for final exposure in FIG. 16.

FIG. 17 is the flow chart of the AF operation for final exposure of step S2302 in FIG. 16. In step S2401, the AF frame setting for final exposure is performed. In the AF frame setting for final exposure, a frame with a given size can be set in the central area, or a plurality of N*N frames can be set. In step S2402, whether or not the principal object detection flag is TRUE is checked. When the flag is TRUE, the step proceeds to step S2403. If not, the step proceeds to step S2409. In step S2403, whether or not the focusing degree calculated in step S2105 in FIG. 15 is high is checked. When the focusing degree is high, the step proceeds to step S2404. If not, the step proceeds to step S2405.

In step S2404, the scan range is set to the first range (1) about the present position of the focus lens 104. Here, it is judged that the principal object is approximately in the in-focus state due to the continuous AF operation, i.e, the position of the focus lens is close to the in-focus position corresponding to the peak of the focus evaluation value, and a narrow scan range is set. In step S2405, whether or not the focusing degree calculated in step S2105 is medium is checked. When the focusing degree is medium, the step proceeds to step S2406. If not, the step proceeds to step S2407. In step S2406, the scan range is set to the second range (2) about the present position of the focus lens 104. Here, it is judged that the focusing degree is not so high though the position of the focus lens is near the in-focus position due to the continuous AF operation, and the scan range is set to a narrow range wider than the first scan range. In step S2407, whether or not the present position of the focus lens 104 is in a macro zone is checked. When the present position is in the macro zone, the step proceeds to step S2408. If not, the step proceeds to step S2409. In step S2408, the scan range is set to the beforehand-stored third range (3) in the macro zone. In step S2409, the scan range is set to the beforehand-stored fourth range (4) that is the entire focus detectable range.

In step S2501, the focus lens 104 is moved to the scan start position. The scan start position is assumed to be the end position of the scan range set in step S2404, S2406, S2408 or S2409. In step S2502, the A/D converting portion 109 converts the analog picture image signal read from the image-pickup element 108 into the digital signal, the image processing portion 110 extracts the high frequency component of the luminance signal from the digital signal, and the CPU 115 executes storage of the high frequency component as the focus evaluation value. In step S2503, the CPU 115 obtains the present position of the focus lens 104, and executes storage of data of this position. In step S2504, the CPU 115 checks whether or not the present position of the focus lens 104 is coincident with the scan finish position. When both positions are coincident, the step proceeds to step S2506. If not, the step proceeds to step S2505. In step S2505, the focus lens 104 is moved toward the scan finish direction by a given amount, and then the step returns to step S2502. In step S2506, the peak position of the focus evaluation value is calculated from the focus evaluation value and its lens position stored in step S2502. In calculation of the peak position of the focus evaluation value, where plural AF frames are set, this calculation can be performed based on the peak position on the wide-angle side of the principal object area determined by the principal object area judgment in FIG. 9. Or, the calculation of the peak position can be performed by another judging method. And, in step S2411, the focus lens 104 is moved to the peak position calculated in step S2506.

As described above, in this embodiment, it is possible to speedily focus on the principal object subsequent to instructions for image-taking preparation operation since the principal object area is determined prior to the instructions for image-taking preparation operation and the principal object area continues to be focused. Further, based on the face detection result and the result at the previous AF scan, the AF scan range for determination of the principal object area can be limited. Accordingly, the image look and efficiency at the time of determination of the principal object area prior to the image-taking preparation operation can be improved.

Figure 18:
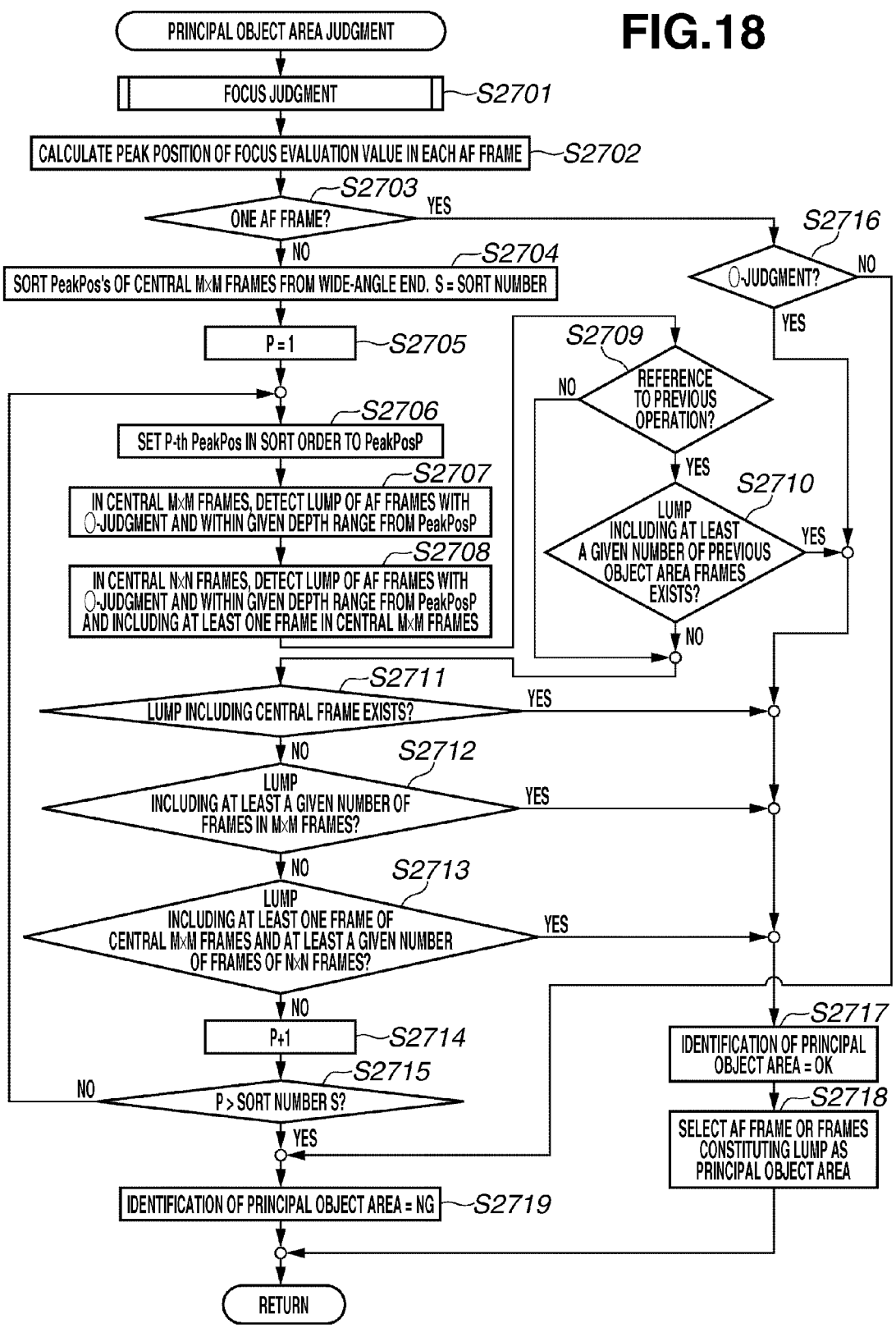
FIG. 18 is a flow chart showing a subroutine of the principal object area judgment in FIGS. 10 and 11 of the second embodiment.

FIG. 18 is the flow chart of the principal object area judgment of step S1108 in FIG. 8 and step S1411 in FIG. 11 of the second embodiment. In the second embodiment, portions of steps S2709 and S2710 are different, as compared with the flow chart in FIG. 9 of the first embodiment. Also in these steps, whether or not the principal object area in the image plane could be determined is judged. FIGS. 10A and 10B also illustrate the example of the principal object area judgment in FIG. 18.

In step S2701, the above-described focus judgment in FIG. 4 is performed for every AF frame set. Also herein, in every AF frame, the focus judgment result is assumed to be one illustrated in FIG. 10A. In step S2702, the peak position of the focus evaluation value in each AF frame is calculated and stored. For example, in every AF frame, the peak position calculation result is assumed to be one illustrated in FIG. 10B. In step S2703, whether or not the number of AF frames set is one (1) is checked. When a single AF frame is set, the step proceeds to step S2716. If not, the step proceeds to step S2704.

In step S2704, PeakPos's of AF frames in the central M*M frames are sorted from the wide-angle end. The number of sort is represented by S. Also herein, M=3. Nine (3*3) frames surrounded by the thick solid line in FIGS. 10A to 10C exhibit the central M*M frames. Here, the peak position of the AF frame with the x-judgment judged in the focus judgment of step S2701 cannot be calculated, so that such an AF frame is excluded from AF frames to be sorted. In the case of FIG. 10B, the sort result from the wide-angle end is indicated as 410, 400, 400, 400, 100, 100, 100 and 90, and the sort number S is S=8.

In step S2705, the count P for showing the order from the wide-angle end of peak positions calculated in step S2702 is set to one (1). In step S2706, the P-th PeakPos in the sort order is set to PeakPosP. In the case of FIG. 10B, when P=1, PeakPosP=410. In step S2707, in the central M*M AF frames, a lump of AF frames with the o-judgment and within a given depth range from the frame of PeakPosP is detected, and the number and positions of AF frames constituting the lump are stored. In step S2708, in the central N*N AF frames, a lump of AF frames with the o-judgment and within a given depth range from the frame of PeakPosP including at least one frame of the central M*M AF frames is detected, and the number and positions of AF frames constituting this lump are stored. In the case of judgment results as illustrated in FIGS. 10A and 10B, the lump including frames illustrated in gray in FIG. 10C is detected.

In step S2709, whether or not the present process of the principal object area judgment is the process at the time of the AF scan for judgment of reference to previous operation of step S806 in FIG. 6 is checked. If so, the step proceeds to step S2710. If not, the step proceeds to step S2711.

In step S2710, whether or not the lump detected in step S2707 or S2708 includes at least a given number of frames of the previous object area is checked. When the lump includes such frame or frames, the step proceeds to step S2717. If not, the step proceeds to step S2711.

In step S2711, whether or not the lump detected in step S2707 or S2708 includes the central frame is checked. When the lump includes the central frame, the step proceeds to step S2717. If not, the step proceeds to step S2712. In step S2712, whether or not the lump detected in step S2707 or S2708 includes at least a given number of frame or frames of the central M*M frames is checked. When the lump includes such frames, the step proceeds to step S2717. If not, the step proceeds to step S2713. In step S2713, whether or not the lump detected in step S2707 or S2708 includes at least a frame of the central M*M frames and at least a given number of frame or frames of the central N*N frames is checked. When the lump includes such frames, the step proceeds to step S2717. If not, the step proceeds to step S2714. In step S2714, one (1) is added to the count P. In step S2715, whether or not the count P is larger than the sort number S is checked. When the count P is larger than the sort number S, the step proceeds to step S2719. If not, the step returns to step S2706.

In step S2716, whether or not the focus judgment result in step S2701 is the o-judgment is checked. When the result is the o-judgment, the step proceeds to step S2717. If not, the step proceeds to step S2719. In step S2717, positive judgment of determination of the principal object area is made. In step S2718, AF frame or frames constituting the lump is judged to be the principal object area and selected, and the current judgment process is finished. In a case where the thus-set AF frame includes only one (1) frame, this one frame is selected.

In step S2719, it is judged that the principal object area could not be determined, and the current judgment process is finished.

As described above, in this embodiment, at the time of determination of the principal object area, the frame including the frame position in the previous principal object area is preferentially selected. Therefore, the determination of the principal object area can be achieved more efficiently and precisely.

Except as otherwise discussed herein, the various components shown in outline or in block form in the Figures are individually well known and their internal construction and operation are not critical either to the making or using, or to a description of the best mode of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-034113, filed Feb. 17, 2009, which is hereby incorporated by reference herein in its entirety.

What is claimed is:

1. An apparatus comprising:
    a receiving unit configured to receive an instruction for focus adjustment;
    an image-pickup unit configured to perform image-pickup of an object image input through a focus lens to output image data;
    a setting unit configured to set a focus detecting area; and
    a focus adjusting unit configured to detect a focus signal representing a focusing state of the focus lens in the focus detecting area while moving the focus lens to adjust a position of the focus lens in a predetermined range based on the focus signal,
    wherein the focus adjusting unit controls a first operation of detecting the focus signal prior to reception of the instruction to determine an object area to be focused, and a second operation of detecting the focus signal based on information of the determined object area to be focused upon reception of the instruction to perform focus adjustment of the focus lens, and judges whether or not an object to be focused can be predicted prior to the first operation to change a manner of the first operation based on a result of a judgment.

2. The apparatus according to claim 1, wherein the focus adjusting unit judges whether or not the object can be predicted by judging whether or not a face is detected based on an output signal of the image-pickup unit, and the focus adjusting unit sets a first move range as a move range of the focus lens in the first operation when the face is not detected, and sets a second move range narrower than the first move range when the face is detected.

3. The apparatus according to claim 2, wherein the second move range is determined based on information obtained by the face detection.

4. The apparatus according to claim 1, wherein the focus adjusting unit judges whether or not the object can be predicted by judging whether or not a present image-taking scene changes from a image-taking scene at a time of a previous AF operation, and the focus adjusting unit sets a first move range as a move range of the focus lens in the first operation when a change in the image-taking scene occurs, and sets a second move range narrower than the first move range when no change in the image-taking scene occurs.

5. The apparatus according to claim 4, wherein the second move range is determined based on a present position of the focus lens.

6. A method for controlling an apparatus including an image-pickup unit for performing image-pickup of an image input through a focus lens to output image data, the method comprising:
    performing a first AF scan operation of performing a scan operation of obtaining an output signal of an extracting unit in a focus detecting area set, in association with a position of the focus lens, while moving the focus lens prior to image-taking preparation operation, and determining an object area to be focused;
    performing a second AF scan operation, which is different from the first AF scan operation, of performing the scan operation to perform a focusing operation at the time of the image-taking preparation operation; and
    judging whether or not an object to be focused can be predicted prior to the performing the first AF scan operation to change a manner of the first AF scan operation based on a result of a judgment.

7. The method according to claim 6, further comprising judging whether or not the object can be predicted by judging whether or not a face is detected based on an output signal of the image-pickup unit;
    setting a first move range as a move range of the focus lens in the first AF scan operation when the face is not detected; and
    setting a second move range narrower than the first move range when the face is detected.

8. The method according to claim 7, further comprising determining the second move range based on information obtained by the face detection.

9. The method according to claim 6, further comprising:
    judging whether or not the object can be predicted by judging whether or not a present image-taking scene changes from a image-taking scene at a time of a previous AF operation,
    setting a first move range as a move range of the focus lens in the first AF scan operation when a change in the image-taking scene occurs; and
    setting a second move range narrower than the first move range when no change in the image-taking scene occurs.

10. The method according to claim 9, further comprising determining the second move range based on a present position of the focus lens.

* * * * *